(12) United States Patent
Aldridge et al.

(10) Patent No.: US 8,920,856 B2
(45) Date of Patent: Dec. 30, 2014

(54) CO-EXTRUDED LAYERED CANDY AND GUM APPARATUS AND METHODS

(75) Inventors: Allen Aldridge, South Orange, NJ (US); Marc Degady, Morris Plains, NJ (US); Cesar Carlos Elejalde, Randolph, NJ (US); Alejandro Jean, Pue. (MX); Bharat Jani, East Brunswick, NJ (US); Ana Lucia Lopez, Morristown, NJ (US); Fernando Melendez, Puebla (MX); Susan J. Pettigrew, Suffern, NY (US); Duane Raible, Great Meadows, NJ (US); Ivonne Ramirez, Puebla (MX); Margarita Tecanhuey, Pue. (MX); Iran Vazquez, Pue. (MX)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 13/499,979

(22) PCT Filed: Oct. 7, 2010

(86) PCT No.: PCT/US2010/051840
§ 371 (c)(1), (2), (4) Date: Apr. 3, 2012

(87) PCT Pub. No.: WO2011/044373
PCT Pub. Date: Apr. 14, 2011

(65) Prior Publication Data
US 2012/0207875 A1 Aug. 16, 2012

Related U.S. Application Data

(60) Provisional application No. 61/249,927, filed on Oct. 8, 2009.

(51) Int. Cl.

| | | |
|---|---|---|
| A23G 3/54 | (2006.01) | |
| A23G 4/20 | (2006.01) | |
| A23P 1/12 | (2006.01) | |
| B65B 25/00 | (2006.01) | |
| A23G 3/34 | (2006.01) | |
| A23G 3/50 | (2006.01) | |
| A23G 4/04 | (2006.01) | |
| A23G 4/18 | (2006.01) | |

(52) U.S. Cl.
CPC .............. *A23G 3/54* (2013.01); *A23G 3/0046* (2013.01); *A23G 3/0068* (2013.01); *A23G 3/50* (2013.01); *A23G 4/043* (2013.01); *A23G 4/18* (2013.01); *A23G 4/20* (2013.01)
USPC .............. 426/5; 426/392; 426/660

(58) Field of Classification Search
USPC .................................................. 426/3, 5
See application file for complete search history.

(56) References Cited

U.S. PATENT DOCUMENTS

| | | |
|---|---|---|
| 146,541 A | 1/1874 | Moore |
| 193,045 A | 7/1877 | Sibley et al. |
| 280,115 A | 6/1883 | Aubin |
| D14,842 S | 3/1884 | Griscom, Jr. |
| 462,990 A | 11/1891 | Oppenheimer |
| 692,323 A | 2/1902 | Marine |
| 1,242,562 A | 10/1917 | Laskey |
| 1,267,320 A | 5/1918 | Fries |
| 1,886,763 A | 4/1930 | Trettin |
| 1,771,506 A | 7/1930 | Mustin |
| 1,771,981 A | 7/1930 | Mustin |
| 1,771,982 A | 7/1930 | Mustin |
| 1,855,145 A | 4/1932 | Jones |
| 2,060,490 A | 5/1933 | Borbely |
| 2,039,398 A | 10/1934 | Dye |
| 2,215,575 A | 9/1940 | Bowman |
| 2,460,698 A | 2/1949 | Lindhe |
| 2,613,185 A | 3/1951 | Marshall |
| 2,559,648 A | 7/1951 | Lindhe |
| 2,604,056 A | 7/1952 | Mahle |
| 2,685,517 A | 8/1954 | Dunmire |
| 2,973,273 A | 2/1961 | Curtiss |
| 3,062,662 A | 11/1962 | McDonald |
| 3,156,195 A | 11/1964 | Evanson et al. |
| 3,208,405 A | 9/1965 | Beer |

(Continued)

FOREIGN PATENT DOCUMENTS

| | | |
|---|---|---|
| EP | 0624318 B1 | 12/1997 |
| EP | 0762834 B1 | 2/1999 |

(Continued)

OTHER PUBLICATIONS

NPL candy vs. confectionery retrieved from Internet on Aug. 29, 2013.*

(Continued)

*Primary Examiner* — Michele L Jacobson
*Assistant Examiner* — Bhaskar Mukhopadhyay
(74) *Attorney, Agent, or Firm* — Cantor Colburn LLP

(57) ABSTRACT

Methods and apparatus are provided for preparing multi-layered confectionery compositions. The multi-layered confectionery compositions are formed using a co-extrusion process of at least two different confectionery compositions that have at least one visual or sensorial distinction. The tolerances of the resulting pieces of the multi-layered confectionery composition are maintained such that the pieces can be packaged in rigid packaging. The processing parameters of processing of the plurality of confectionery compositions prior to the step of cutting and wrapping the pieces can be altered so as to maintain the average piece size within a predetermined tolerance level.

16 Claims, 6 Drawing Sheets

(56) References Cited

U.S. PATENT DOCUMENTS

| | | | |
|---|---|---|---|
| 3,303,796 | A | 2/1967 | Novissimo |
| 3,410,230 | A | 11/1968 | Rossi |
| 3,477,394 | A | 11/1969 | Tidwell |
| 3,492,131 | A | 1/1970 | Schlatter |
| 3,549,389 | A | 12/1970 | Peterson |
| 3,857,965 | A | 12/1974 | Ream |
| 3,865,957 | A | 2/1975 | Schieweck et al. |
| 3,908,032 | A | 9/1975 | Didelot et al. |
| 3,912,817 | A | 10/1975 | Sapsowitz |
| 4,032,661 | A | 6/1977 | Rowsell et al. |
| 4,097,616 | A | 6/1978 | Guillou et al. |
| 4,136,163 | A | 1/1979 | Watson et al. |
| 4,150,161 | A | 4/1979 | Rudolph et al. |
| 4,178,459 | A | 12/1979 | Watson et al. |
| 4,224,345 | A | 9/1980 | Tezuka et al. |
| 4,230,688 | A | 10/1980 | Rowsell et al. |
| 4,238,510 | A | 12/1980 | Cherukuri et al. |
| 4,254,149 | A | 3/1981 | Rudolph et al. |
| 4,260,635 | A | 4/1981 | Fisher |
| 4,271,197 | A | 6/1981 | Hopkins et al. |
| 4,271,199 | A | 6/1981 | Cherukuri et al. |
| 4,279,931 | A | 7/1981 | Verwaerde et al. |
| 4,292,337 | A | 9/1981 | Andersen |
| 4,296,255 | A | 10/1981 | Roswell et al. |
| 4,323,588 | A | 4/1982 | Vink et al. |
| 4,346,116 | A | 8/1982 | Verwaerde et al. |
| 4,352,823 | A | 10/1982 | Cherukuri et al. |
| 4,352,824 | A | 10/1982 | Puglia et al. |
| 4,352,825 | A | 10/1982 | Cherukuri et al. |
| 4,399,154 | A * | 8/1983 | Puglia et al. ............... 426/5 |
| D271,344 | S | 11/1983 | Faust |
| D271,534 | S | 11/1983 | Huzinec |
| D271,535 | S | 11/1983 | Huzinec |
| 4,459,425 | A | 7/1984 | Amano et al. |
| 4,491,596 | A | 1/1985 | Elias |
| 4,496,592 | A | 1/1985 | Kuwahara et al. |
| 4,601,907 | A | 7/1986 | Knebl et al. |
| 4,614,654 | A | 9/1986 | Ream et al. |
| 4,619,834 | A | 10/1986 | Zanno et al. |
| 4,671,961 | A | 6/1987 | Patel et al. |
| 4,707,363 | A | 11/1987 | Sato et al. |
| 4,714,620 | A | 12/1987 | Bunick et al. |
| 4,741,905 | A | 5/1988 | Huzinec |
| 4,753,806 | A | 6/1988 | Carroll et al. |
| 4,781,929 | A | 11/1988 | Hoashi |
| 4,822,621 | A | 4/1989 | Glass et al. |
| 4,822,622 | A | 4/1989 | Dokuzovic et al. |
| 4,822,628 | A | 4/1989 | Huc |
| 4,847,090 | A | 7/1989 | Della Posta et al. |
| 4,889,729 | A | 12/1989 | Aujourd'hui |
| 4,911,937 | A | 3/1990 | Crosello et al. |
| 4,938,128 | A | 7/1990 | Knebl |
| 4,971,806 | A | 11/1990 | Cherukuri et al. |
| 5,009,893 | A | 4/1991 | Cherukuri et al. |
| 5,017,385 | A | 5/1991 | Wienecke |
| 5,091,198 | A | 2/1992 | Hoashi |
| 5,135,760 | A | 8/1992 | Degady et al. |
| 5,147,675 | A * | 9/1992 | Gage et al. .................. 426/549 |
| 5,206,042 | A | 4/1993 | Dave et al. |
| 5,266,592 | A | 11/1993 | Grub et al. |
| 5,314,701 | A | 5/1994 | Mentink et al. |
| 5,397,580 | A | 3/1995 | Song et al. |
| 5,407,665 | A | 4/1995 | McLaughlin et al. |
| 5,419,093 | A | 5/1995 | Wei |
| 5,437,879 | A * | 8/1995 | Kabse et al. ................ 426/5 |
| 5,462,760 | A | 10/1995 | Serpelloni et al. |
| 5,470,591 | A | 11/1995 | Ribadeau-Dumas et al. |
| 5,480,308 | A | 1/1996 | Boundy |
| 5,538,741 | A | 7/1996 | Richey et al. |
| 5,538,742 | A | 7/1996 | McHale et al. |
| 5,545,424 | A | 8/1996 | Nakatsu et al. |
| 5,567,467 | A | 10/1996 | Kondou et al. |
| 5,580,601 | A | 12/1996 | Ribadeau-Dumas et al. |
| 5,637,313 | A | 6/1997 | Chau et al. |
| 5,679,397 | A | 10/1997 | Kuroda et al. |
| 5,698,181 | A | 12/1997 | Luo |
| 5,712,030 | A | 1/1998 | Goto et al. |
| 5,714,157 | A * | 2/1998 | Sandell et al. ............... 424/409 |
| 5,834,044 | A | 11/1998 | Schmitz et al. |
| 5,879,728 | A | 3/1999 | Graff et al. |
| 5,900,261 | A | 5/1999 | Ribadeau-Dumas et al. |
| 5,958,471 | A | 9/1999 | Schwarz et al. |
| 5,958,472 | A | 9/1999 | Robinson et al. |
| 6,056,988 | A | 5/2000 | Bangerter et al. |
| 6,060,078 | A | 5/2000 | Lee |
| D426,935 | S | 6/2000 | Zaug et al. |
| D430,347 | S | 8/2000 | van der Hagen |
| D431,342 | S | 10/2000 | Wright et al. |
| D433,083 | S | 10/2000 | Griffith |
| 6,159,509 | A | 12/2000 | Johnson et al. |
| 6,165,521 | A | 12/2000 | Mayfield |
| 6,180,143 | B1 | 1/2001 | Rapp et al. |
| 6,277,385 | B1 | 8/2001 | Luke |
| 6,294,200 | B1 * | 9/2001 | Conte et al. .................. 424/472 |
| 6,372,271 | B1 | 4/2002 | Fritzsching et al. |
| 6,417,346 | B1 | 7/2002 | Salome et al. |
| 6,444,240 | B1 | 9/2002 | Barkalow et al. |
| 6,555,146 | B1 | 4/2003 | Rapp et al. |
| 6,562,392 | B1 | 5/2003 | Rapp et al. |
| 6,592,884 | B2 | 7/2003 | Hofmann et al. |
| 6,623,266 | B2 | 9/2003 | Jani et al. |
| 6,627,233 | B1 | 9/2003 | Wolf et al. |
| 6,759,069 | B2 | 7/2004 | Gray |
| 6,780,443 | B1 | 8/2004 | Nakatsu et al. |
| 6,783,779 | B2 | 8/2004 | Rapp et al. |
| 6,805,890 | B2 | 10/2004 | Wu et al. |
| 6,860,089 | B2 | 3/2005 | VanAlstine |
| 6,890,582 | B2 | 5/2005 | Parady |
| 7,030,273 | B1 | 4/2006 | Sun |
| 7,049,299 | B2 | 5/2006 | Francois |
| 7,112,345 | B1 | 9/2006 | McHale et al. |
| 7,189,760 | B2 | 3/2007 | Erman et al. |
| 7,300,679 | B1 | 11/2007 | Robinson et al. |
| 7,438,939 | B2 | 10/2008 | McCarrick |
| D616,177 | S | 5/2010 | Brown et al. |
| D161,423 | S | 5/2012 | Claflin |
| 2002/0113632 | A1 | 8/2002 | Yatka et al. |
| 2002/0136812 | A1 | 9/2002 | Degady et al. |
| 2002/0142059 | A1 * | 10/2002 | Jani et al. .................. 425/131.1 |
| 2003/0026826 | A1 | 2/2003 | Cherukuri et al. |
| 2003/0129281 | A1 | 7/2003 | Murray et al. |
| 2003/0134012 | A1 | 7/2003 | Mederer |
| 2004/0156794 | A1 | 8/2004 | Barkalow et al. |
| 2004/0234648 | A1 | 11/2004 | Mazurek et al. |
| 2004/0247746 | A1 | 12/2004 | Pearce et al. |
| 2005/0220934 | A1 | 10/2005 | Leadbeater et al. |
| 2005/0222256 | A1 | 10/2005 | Erman et al. |
| 2005/0226990 | A1 | 10/2005 | Pellecer et al. |
| 2005/0265930 | A1 | 12/2005 | Erman et al. |
| 2006/0037910 | A1 | 2/2006 | Shah et al. |
| 2006/0057276 | A1 | 3/2006 | Carcasona et al. |
| 2006/0204451 | A1 | 9/2006 | Salini |
| 2006/0286201 | A1 | 12/2006 | Jani et al. |
| 2007/0014889 | A1 | 1/2007 | McHale et al. |
| 2007/0137502 | A1 | 6/2007 | Fornaguera |
| 2007/0141198 | A1 | 6/2007 | Yang |
| 2007/0148303 | A1 | 6/2007 | Yeager et al. |
| 2007/0160707 | A1 | 7/2007 | Garcia |
| 2007/0184149 | A1 | 8/2007 | Barkalow et al. |
| 2007/0196534 | A1 | 8/2007 | Barkalow et al. |
| 2007/0231425 | A1 | 10/2007 | Ream et al. |
| 2007/0231426 | A1 | 10/2007 | Acar et al. |
| 2007/0231427 | A1 | 10/2007 | Ream |
| 2007/0246483 | A1 | 10/2007 | Boudy et al. |
| 2007/0286926 | A1 | 12/2007 | Bunkers et al. |
| 2008/0095899 | A1 | 4/2008 | Fornaguera |
| 2008/0160138 | A1 | 7/2008 | Boghani et al. |
| 2008/0166449 | A1 | 7/2008 | Kabse et al. |
| 2008/0187621 | A1 | 8/2008 | Boghani et al. |
| 2008/0199564 | A1 | 8/2008 | Boghani et al. |
| 2008/0248089 | A1 | 10/2008 | Bugge et al. |
| 2009/0029018 | A1 * | 1/2009 | Elejalde et al. ............... 426/284 |
| 2009/0053390 | A1 | 2/2009 | Sakou et al. |
| 2009/0123502 | A1 | 5/2009 | Kumiega et al. |

(56) References Cited

U.S. PATENT DOCUMENTS

| | | | |
|---|---|---|---|
| 2009/0142443 | A1 | 6/2009 | Robinson et al. |
| 2009/0142444 | A1 | 6/2009 | Jarrard, Jr. et al. |
| 2009/0214720 | A1 | 8/2009 | Almenares et al. |
| 2010/0136165 | A1 | 6/2010 | Miladinov et al. |
| 2011/0159142 | A1 | 6/2011 | Marin et al. |
| 2011/0159143 | A1 | 6/2011 | Elejalde et al. |
| 2011/0268837 | A1* | 11/2011 | Jani .................................. 426/5 |
| 2012/0034346 | A1 | 2/2012 | Morgan |

FOREIGN PATENT DOCUMENTS

| | | | |
|---|---|---|---|
| EP | 0953295 | A1 | 11/1999 |
| EP | 1554935 | A1 | 7/2005 |
| GB | 2079129 | A | 1/1982 |
| GB | 2115672 | A | 9/1983 |
| GB | 2177587 | A | 6/1986 |
| JP | 48-5971 | | 3/1973 |
| JP | S60186250 | | 9/1985 |
| JP | S6443152 | | 2/1989 |
| JP | S6443153 | | 2/1989 |
| JP | 01128751 | A | 5/1989 |
| JP | H1-191646 | | 8/1989 |
| JP | H4-179445 | | 6/1992 |
| JP | 07123923 | | 11/1993 |
| JP | 6046760 | A | 2/1994 |
| JP | 09075005 | | 9/1995 |
| JP | 2002516672 | | 6/2002 |
| JP | 2003504041 | | 2/2003 |
| JP | 3107782 | | 2/2005 |
| JP | 3111014 | | 7/2005 |
| JP | 2005333946 | | 12/2005 |
| JP | 2006-158234 | | 6/2006 |
| JP | 2007289129 | | 11/2007 |
| JP | 2012197242 | A | 10/2012 |
| KR | 100231258 | | 11/1999 |
| KR | 20090039105 | | 4/2009 |
| KR | 100919653 | B1 | 9/2009 |
| WO | 9508926 | | 4/1995 |
| WO | 9726798 | | 7/1997 |
| WO | 0103513 | | 1/2001 |
| WO | 03032744 | A1 | 4/2003 |
| WO | 2006026298 | A3 | 3/2006 |
| WO | 2006063189 | A3 | 6/2006 |
| WO | 2006083784 | A1 | 8/2006 |
| WO | 2006118827 | A3 | 11/2006 |
| WO | 2006125334 | A1 | 11/2006 |
| WO | 2006127599 | | 11/2006 |
| WO | 2006127601 | A3 | 11/2006 |
| WO | 2006127602 | A3 | 11/2006 |
| WO | 2006127603 | A3 | 11/2006 |
| WO | 2007047227 | A2 | 4/2007 |
| WO | 2007051485 | | 5/2007 |
| WO | 2007070061 | A1 | 6/2007 |
| WO | 2007124093 | A2 | 11/2007 |
| WO | 2008016940 | A1 | 2/2008 |
| WO | 2008025809 | A1 | 3/2008 |
| WO | 2008030274 | A1 | 3/2008 |
| WO | 2008067207 | A1 | 6/2008 |
| WO | 2008100854 | A1 | 8/2008 |
| WO | 2008105908 | A1 | 9/2008 |
| WO | 2009135100 | A1 | 11/2009 |
| WO | 2009135101 | | 11/2009 |
| WO | 2009135147 | A1 | 11/2009 |
| WO | 2009154887 | | 12/2009 |

OTHER PUBLICATIONS

IPRP Apr. 19, 2012, PCT/US2010/051840.
U.S. Appl. No. 12/913,058, filed Oct. 27, 2010.
U.S. Appl. No. 12/990,096, National Stage filed Oct. 28, 2010.
U.S. Appl. No. 12/990,319, National Stage filed Mar. 11, 2011.
U.S. Appl. No. 12/990,546, filed May 1, 2009.
U.S. Appl. No. 12/990,563, National Stage filed Nov. 2, 2010.
JP2007215450 A, Abstract, Aug. 30, 2007, 1 page.
JP2796425 B2, Abstract, Sep. 10, 1998, 1 page.
DE3732677 A1, Abstract, Apr. 6, 1989, 1 page.
JP4179445 A, Abstract, Jun. 26, 1992, 1 page.
JP5308905 A, Abstract, Nov. 22, 1993, 1 page.
Boomer Super Bubble Gum—Apple, Report No. 315613, Publication Date Mar. 7, 2005.
Boomer Super Bubble Gum—Jelly Watermelon, Report No. 270287, Publication Date Sep. 1, 2003.
Boomer Fresh Gel Super Bubble Gum—Lemon Mint, Report No. 348893, Publication Date Jan. 23, 2006.
Boomer Super Bubble Gum—Mango Jelly, Report No. 391793, Publication Date Oct. 7, 2006.
Boomer Jelly Super Bubble Gum—Orange, Report No. 348891, Publication Date Jan. 23, 2006.
European Search Report, Application No. 10189107.5-1221 dated Mar. 8, 2011, 11 pages.
Fritz, "Using Confectionery Equipment of Manufacture Chewing Gum", The Manufacturing Confectioner, Nov. 2000, p. 45-48.
International Preliminary Report on Patentability and Written Opinion of the International Searching Authority. International Application No. PCT/US2009/042468. International Filing Date May 1, 2009, 8 pages.
International Preliminary Report on Patentability and Written Opinion of the International Searching Authority. International Application No. PCT/US2009/042478. International Filing Date May 1, 2009, 8 pages.
International Preliminary Report on Patentability and Written Opinion of the International Searching Authority. International Application No. PCT/US09/042495. International Filing Date May 1, 2009. 8 pages.
International Preliminary Report on Patentability and Written Opinion of the International Searching Authority. International Application No. PCT/US2009/042524. International Filing Date May 1, 2009, 8 pages.
International Preliminary Report on Patentability and Written Opinion of the International Searching Authority. International Application No. PCT/US2009/042557. International Filing Date May 1, 2009, 9 pages.
International Preliminary Report on Patentability and Written Opinion of the International Searching Authority. International Application No. PCT/US09/042573. International Filing Date May 1, 2009, 8 pages.
ISR PCT US2010 051840, Jun. 30, 2011.
Joyco Boomer Jelly Bubble Gum—Pineapple, Report No. 293583, Publication Date Jun. 21, 2004.
Kirk-Othmer Encyclopedia of Chem. Tech. 4th Ed. vol. 1, p. 492-494, 1991.
Raleigh, "HSH as a Bulking Agent in Confections", The Manufacturing Confectioner, Nov. 1995, p. 57-59.
Wrigley'S Doublemint Chewing Gum—Gel, Report No. 335513, Publication Date Oct. 3, 2005.
CN OA Application No. 200980125809.4 dated May 9, 2013.
CN OA Application No. 201080055962.7 dated May 28, 2013.
JP OA Application No. 2011-507673 dated Jun. 18, 2013.
JP OA Application No. 2011-507682 dated Jun. 18, 2013.
JP OA Application No. 2012-533320 dated Jun. 4, 2013.
CN 2d OA 200980125641.7 dated Mar. 27, 2013.
CN 2nd OA 200980125643.6 dated Mar. 27, 2013.
AU ER 2010206706 dated Jul. 17, 2012.
IPRP, PCT/US2010/021768, Date of Mailing Aug. 4, 2011.
International Search Report and Written Opinion for PCT/US2010/021768, mailing date Mar. 19, 2010, 12 pages.
CN OA 201080005186.X dated Sep. 18, 2012.
CN OA Application No. 201080005186.X dated Jun. 6, 2013.
JP OA 2011-548126 dated Jun. 11, 2013, English Translation.
Japanese Unexamined Patent Application (Translation of PCT Application), Publication No. 2004-517628, see reference listed under Prior Art Search Results in JP OA dated Jun. 11, 2013.
Japanese Unexamined Patent Application, Publication No. S50-46864, see reference listed under Prior Art Search Results in JP OA dated Jun. 11, 2013.

(56) References Cited

OTHER PUBLICATIONS

Japanese Unexamined Patent Application, Publication No. S64-39930, see reference listed under Prior Art Search Results in JP OA dated Jun. 11, 2013.
Notice of Reasons for Rejection JP Patent Application No. 2011-548126 dated Jan. 8, 2013.
Nabors, L.O., Ed. 2001. "Alternative Sweeteners." 3rd ed. New York: M. Dekker. pp. 1, 340.
Mitchell, Helen, Ed. 2006. "Sweeteners and Sugar Alternatives in Food Technology," Chichester, GBR. Wiley. pp. 170-171.
CN OA 200980125821.5 dated Jun. 18, 2013.
Chocolate Layer Cake with Caramel Ganache, posted Aug. 2010, retrieved Mar. 22, 2013]. Retrieved from Internet, http://heavenlycakeplace.blogspot.com/2010/08/chocolate-layer-cake-with-caramel.html.
Non-Final Office Action, U.S. Appl. No. 29/407,928, dated Apr. 9, 2013.
Trident Layers, posted Sep./Oct. 2009, p. 4, [retrieved Mar. 22, 2013]. Retrieved from Internet, http://onlinedigitalpublishing.com/publication/?i=24473.
Wolfgang Chocolate Dipped Berries, posted Sep./Oct. 2009, p. 51, [retrieved Mar. 22, 2013]. Retrieved from Internet, http://onlinedigitalpublishing.com/publication/?i=24473.
EP ER 10189107.5-1221 dated Jan. 20, 2012.
JP OA 2012-022671 dated Mar. 26, 2013.
U.S. Appl. No. 13/145,387 National Stage Utility Application of PCT/US2010/021768 filed Jul. 20, 2011.
U.S. Appl. No. 29/407,928 Continuation Design Application filed Dec. 5, 2011.
JP 2003512445, with Eng Abstract; see also English equivalent US 6,417,346.
JP 2004534852, with Eng Abstract; see also English equivalent US 7,049,299.
JP 3rd OA, Application No. 200980125641.7 dated Sep. 26, 2013.
NPL Candy vs. Confectionery, retrieved from Internet on Aug. 29, 2013—cited in Sep. 10, 2013 Non-Final Office Action in U.S. Appl. No. 13/499,979.
JP2009171961; Aug. 6, 2009; Machine Translation; 16 pages.
JP 2011-548126 OA dtd Oct. 22, 2013.
CN OA Application No. 200980125815.X dated Sep. 29, 2013.
JP 2011-507682 OA dtd Oct. 15, 2013.
JP OA 2012-533320 dated Nov. 19, 2013, with English Translation.
CN OA 102080005186.X dated Dec. 24, 2013.
EP ER 10701301.3-1358_Jan. 16, 2014.
EP Er 12000487.4 dated Jan. 20, 2014.
EP OA Application No. 09739902.6.1357 dated Mar. 31, 2014.
CN OA 200980125643.6 dated Oct. 15, 2013.
JP OA 2011507674 dated Feb. 4, 2014.
JP OA 20111507689 dated Feb. 4, 2014.
EP SR 10822704.2 dated Jul. 11, 2014.
AU ER 2013206701 dated Aug. 8, 2014.
CN OA 201080005186.X dated Aug. 5, 2014.
JP OA 2013-097962 dated Aug. 19, 2014.
EP OA Application No. 09739902.6-1357 dated Mar. 31, 2014.
JP OA 20111597689 dated Feb. 4, 2014.
AU ER Patent Application No. 2013206700 dated Apr. 10, 2014.
CN OA Aplication No. 200980125641.7 dated Mar. 14, 2014.
CN OA Application No. 201080055962.7 dated Apr. 2, 2014.
Non-Final Office Action, U.S. Appl. No. 13/145,387, dated Jul. 17, 2014.
CN OA Application No. 2000980125642.1_dated Nov. 1, 2013.
CN OA Application No. 200980125809.4_dated Nov. 7, 2013.
OA Application No. 09 739 902.6-1357, dated Sep. 24, 2014.
OA Application No. 2011-507674, dated Oct. 14, 2014
OA Application No. 2011-507689, dated Oct. 14, 2014.
OA Application No. 2013-102743, dated Sep. 30, 2014.

* cited by examiner

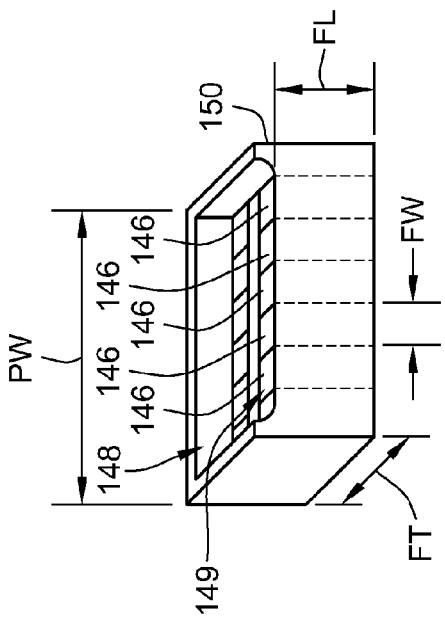
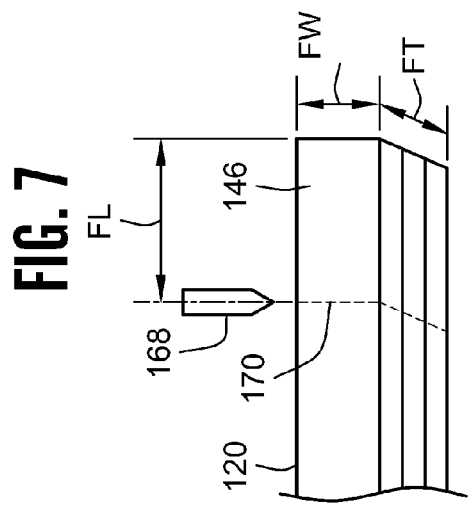
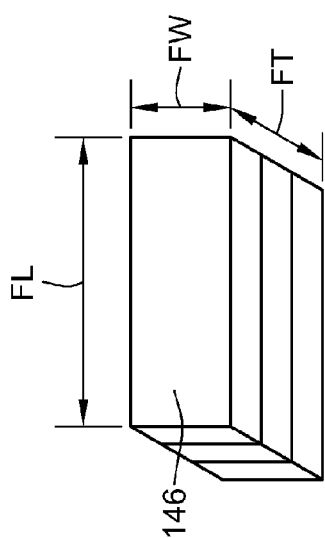
FIG. 6
FIG. 7
FIG. 9
FIG. 10

CO-EXTRUDED LAYERED CANDY AND GUM APPARATUS AND METHODS

Cross Reference To Related Applications

This is a U.S. national stage of application no. PCT/US2010/051840, filed on 7 Oct. 2010, which claims priority to 61/249,927 filed 8 Oct. 2009, the disclosures of which is incorporated herein by reference.

FIELD OF THE INVENTION

The present invention generally relates to confectionery manufacturing systems and methods and particularly to confectionery manufacturing systems and methods for manufacturing multilayered confectionery compositions including at least two confectionery composition layers formed from differing confectionery compositions.

BACKGROUND OF THE INVENTION

Typically, confectionery compositions such as gum or candy have been distributed as entirely separate products or distributed as products that are ingested as substantially separate products. More particularly, some current confectionery products will provide a hard candy outer-shell that will encase a separate confectionery composition such as a gum or a chewy toffee type confection. Unfortunately, the user is given no visual benefits of being provided two separate confectionery compositions at the same time nor do they simultaneously get the flavor and sensorial benefits of both separate confectionery compositions. The present invention therefore relates to improvements in the art of multiple composition confectionery compositions.

BRIEF SUMMARY OF THE INVENTION

Embodiments of the present invention relate to improvements in methods and manufacturing systems for producing confectionery compositions formed from multiple different confectionery compositions. The multiple confectionery compositions are arranged in a plurality of layers to form a multilayered confectionery composition. The different confectionery compositions forming the multilayered confectionery composition differ in at least one characteristic. In some embodiments, the different layers provide an improved consumer experience. The different characteristic between the different confectionery compositions may be, either aesthetic or physical to provide visual, functional or taste/sensorial-based distinctions between the various layers so as to enhance the overall user experience in consuming the multi-layered confectionery composition.

Thus, at least two different confectionery compositions, differing from one another in at least one characteristic, will be included, in substantially distinct layers, in the final multilayered confectionery composition.

In some methods of forming a multi-layer confectionery composition comprise co-extruding a first confectionery composition with a second confectionery composition to form a continuous multi-layered rope comprised of at least one layer of the first confectionery composition and at least one layer of the second confectionery composition; sizing the multi-layered rope; and cutting the multi-layered rope into pieces.

In some embodiments, a first confectionery composition in the multi-layered confectionery composition will typically be a gum composition. A second confectionery composition in the multi-layered confectionery composition will typically be, but not in all embodiments, a candy composition. However, it is contemplated that other embodiments may not include any gum composition and even further embodiments may be formed exclusively from gum compositions.

By combining different confectionery compositions, multilayered confectionery compositions having improved characteristics including varying flavor profiles, textures, flavor release characteristics, functional ingredients, visual appeal, etc. can be manufactured to meet the demands of consumers or to otherwise provide an enhanced consumer experience. By providing, in preferred embodiments, both a candy layer and a gum layer, the multilayered confectionery composition can provide the instant flavor gratification of a candy, but it will still provide a long lasting flavor product of a gum.

To that end, in one embodiment, a method of forming a multi-layer confectionery composition includes co-extruding a first confectionery composition with a second confectionery composition to form a continuous multi-layered rope comprised of at least one layer of the first confectionery composition and at least one layer of the second confectionery composition; sizing the multi-layered rope to a desired final width and desired final thickness; cutting the multi-layered rope into pieces having dimensions of the desired final width, the desired final thickness and a desired final length; wrapping the pieces; grouping the pieces into packaging groups; and inserting the packaging groups into a rigid package.

In a more particular implementation, the first confectionery composition is a gum composition. In a further implementation, the method further includes a step of pre-extruding the first confectionery composition prior to the step of co-extruding the gum composition. Additionally, methods may include pre-conditioning the first confectionery composition prior to a step of co-extruding the first confectionery composition. Further, methods may include post-conditioning the multi-layered rope subsequent to the step of co-extruding the first confectionery composition with the second confectionery composition.

In some embodiments, the step of sizing the multi-layered rope includes stretching the rope by rope-sizing, wherein the rope-sizing includes passing the multi-layered rope through a plurality of consecutive pairs of counter rotating rollers acting on opposed top and bottom surfaces of the multi-layered rope, the stretching of the rope increasing the linear speed of the multi-layered rope at each pair of counter rotating rollers. In more particular embodiments, the stretching of the multi-layered rope elongates the rope linearly along a length dimension and reduces the thickness and width of the rope, the thickness and width being perpendicular to the length and the direction along which the rope travels during the rope-sizing step. This stretching may be performed by rope-sizing which is performed by a plurality of consecutive pairs of counter rotating rollers wherein successive pairs of rollers decrease in size when traveling along a travel path defined by the rope.

To maintain good adhesion between various layers, in some embodiments, the first confectionery composition and the second confectionery composition have a desired viscosity ratio of no greater than 3:1. More preferably, the first confectionery composition and the second confectionery composition have a desired viscosity ratio of no greater than 2:1. To that end, in some embodiments, the method may particularly require the step of maintaining the viscosity ratio below the desired viscosity ratio.

The step of maintaining the viscosity ratio may include recycling a portion of the first confectionery composition that is being dispensed from the pre-extruder during the step of pre-extruding. Recycling may include directly returning the recycled portion of the first confectionery composition exiting the pre-extruder into the pre-extruder without any processing of the recycled portion of the first confectionery composition.

In some embodiments, it is desired to have highly tolerenced piece sizes. Some methods may further include the step of homogenizing the first confectionery composition, which includes pre-extruding the first confectionery composition prior to the step of co-extruding. The step of pre-extruding includes recycling a portion of the pre-extruded confectionery.

As piece size can be important, some methods include sampling an average size of a first plurality of pieces and adjusting the processing parameters when the average size is outside of a predetermined tolerance range. This may further include the step of pre-extruding the first confectionery composition prior to the step of co-extruding the first confectionery composition. The step of pre-extruding includes recycling a portion of the pre-extruded first confectionery composition such that the recycled portion must be pre-extruded more than once. Further, the step of adjusting the processing parameters includes increasing the amount of recycle when the average size is outside the predetermined tolerance range. In some embodiments, the step of adjusting the processing parameters includes increasing the amount of work put into the first confectionery composition by one or more of the pre-extruder or co-extruder when the average size is outside the predetermined tolerance range. In further embodiments, the step of adjusting the processing parameters includes either reducing or increasing the rate at which the first confectionery composition is fed into the co-extruder when the average size is outside the predetermined tolerance range.

In other embodiments, at least one of the first or second confectionery compositions is a chewy candy composition, including fondant as an ingredient, the fondant not being discernable from the rest of the ingredients in the chewy candy. The method may further include a step of substantially crystallizing the chewy candy composition prior to the step of inserting the packaging groups into the rigid package. This prevents oozing and cold flow of the chewy candy subsequent to packaging.

In some embodiments, the step of co-extruding includes extruding a multi-layered rope having three consecutive layers, including a first layer, a second layer and a third layer, the second layer sandwiched between the first and third layers, wherein the first and third layers are formed of a same confectionery composition. In preferred implementations, the first and third layers are formed from the first confectionery composition, which is a gum composition, and wherein the gum composition has a viscosity value that is greater than the second layer during the step of sizing the multi-layered rope.

To eliminating tolerance stack-up during packaging, in some embodiments, the step of cutting the multi-layered rope into pieces includes defining a final length of the individual pieces during the step of cutting.

To prevent sticking of the confectionery compositions to the processing equipment without eliminating visual appeal of the distinct layers, particularly when using chewy candy, preferred methods may include the step of applying an anti-adhesive processing aid to the multi-layered rope prior to the step of sizing the multi-layered rope. Further, the anti-adhesive processing aid does not provide any residue that significantly affects the visual layered characteristics of the multi-layered rope. In some embodiments, the step of applying an anti-adhesive processing aid to the multi-layered rope prior to the step of sizing the multi-layered rope includes applying an anti-adhesive processing aid that is a mineral oil.

In some embodiments, after the step of co-extruding, the multilayered rope has a first layer formed by the second confectionery composition sandwiched between second and third layers formed by the first confectionery composition; the first layer has a first surface in direct contiguous contact with a first surface of second layer and the first layer has a second surface, opposite the first surface, in direct contiguous contact with a first surface of a third layer. The multi-layered rope has a width and thickness, both being substantially perpendicular to one another and the length of the rope, that are greater than a desired final width and a desired final thickness.

To prepare the multi-layered rope for cutting and wrapping, in some embodiments, the method further comprises a step of conditioning the multi-layered rope after the step of sizing.

In a further embodiment, a method of co-extruding a multi-layered confectionery composition having at least one lower viscosity layer sandwiched between two higher viscosity layers comprises the steps of extruding a continuous multi-layered rope of the multi-layered confectionery composition having an initial width and an initial thickness that are greater than two dimensions of a final piece of the multi-layered confectionery composition; bulk-sizing the multi-layered rope including: stretching the multi-layered rope along the flow path of the multi-layered rope, and contracting both a width and a thickness of the multi-layered rope.

In preferred implementation, the step of stretching includes accelerating the linear speed of the multi-layered rope along the flow path of the multi-layered rope. Further, the step of contracting both a width and a thickness of the multi-layered rope may be performed simultaneously with as well as a result of the step of stretching the multi-layered rope. The steps of stretching and contracting simultaneously may alter the dimensions of all of the layers of the multi-layered rope. However, in some embodiments, different ones of the layers stretch or contract at different rates than other ones of the layers.

In one preferred implementation, the initial thicknesses of each layer are equal, wherein after the step of contracting, the thicknesses of the layers are unequal. In one embodiment, the initial widths of at least two layers are un-equal having a first percentage difference therebetween. After the step of bulk sizing, the widths of the at least two layers have a second percentage difference therebetween that is less than the first percentage difference. In one more particular embodiment, the second percentage difference is less than 5%. In a further more particular embodiment, the second percentage difference is less than 0.5%.

In some embodiments, the layered confection need not be performed by a co-extrusion process. As such in one embodiment, a method of forming pieces of a multi-layered confectionery composition comprises the steps of forming a multi-layered rope including a first confectionery composition forming a first layer of the multi-layered rope and a second confectionery composition, different in at least one characteristic from the first confectionery composition, forming a second layer of the multi-layered rope; conditioning the multi-layered rope; severing the multi-layered rope into individual pieces, after the step of conditioning the multi-layered rope; and wherein the first and second layers each define a portion of the outer-periphery of the cross-section of the multi-layered rope.

In some methods, the step of forming includes co-extruding or laminating the layers of the multi-layered rope. In more particular methods, the multi-layered rope includes a third layer, the first, second and third layers forming a portion of the outer-periphery of the cross-section of the multi-layered rope.

Methods may further comprise a step of sizing the multi-layered rope prior to the step of conditioning. Methods may further include a step of sizing the multi-layered rope after the step of conditioning. In a preferred embodiment, the layers of the multi-layered rope are non-concentric sheets.

To maintain good piece size and to prevent the multi-layered confection from separating between individual layers, in some embodiments, the method includes maintaining a homogenous temperature of at least one composition prior to co-extruding. One such method includes forming a multi-layered confectionery composition including the steps of co-extruding a multi-layered rope including a first confectionery composition providing a first layer of the multi-layered rope and a second confectionery composition, different in at least one characteristic from the first confectionery composition, providing a second layer of the multi-layered rope; wherein a temperature of the first confectionery composition immediately prior to the step of co-extruding the multi-layered rope is a substantially homogenous temperature.

In a more particular implementation, the substantially homogenous temperature has a tolerance level of plus or minus 5 degrees Celsius. In a more particular embodiment, the substantially homogenous temperature has a tolerance level of plus or minus 3 degrees Celsius. These methods may further include a step of pre-extruding the first confectionery composition prior to the step of co-extruding the multi-layered rope to increase the homogeneity of the temperature of the first confectionery composition prior to the step of co-extruding. The step of pre-extruding may include recycling a portion of the first confectionery composition such that at least a portion of the first confectionery composition is pre-extruded more than once to increase the temperature homogeneity of the first confectionery composition prior to the step of co-extruding. At least 25 percent of the output of the step of pre-extruding may be recycled. At least 50 percent of the output of the step of pre-extruding may be recycled. At least 75 percent of the output of the step of pre-extruding may be recycled.

These methods may further include the step of producing the first confectionery composition using a batch production process and further comprising the step of storing a portion of the first confectionery composition for less than about 2 hours and greater than about 10 minutes prior to the step of pre-extruding. Alternatively, the step of storing the first confectionery composition for less than about 1 hour prior to the step of pre-extruding.

When the first confectionery composition is a gum composition, the substantially homogenous temperature may be about 50 degrees Celsius in one embodiment. In alternative embodiments, the substantially homogenous temperature of the gum composition is selected from the group consisting of 45, 46, 47, 48, 49, 50, 51, 52, 53, 54 and 55 degrees Celsius.

When the first confectionery composition is a candy composition, the substantially homogenous temperature is about 35 degrees Celsius in one embodiment. In alternative embodiments, the substantially homogenous temperature of the gum composition is selected from the group consisting of about 30, 31, 32, 33, 34, 35, 36, 37, 38, 39, and 40 degrees Celsius.

Some methods of the invention include maintaining a homogenous temperature of at least one composition after the step of co-extruding. One particular embodiment includes a method of forming a multi-layered confectionery composition comprising the steps of co-extruding a multi-layered rope including a first confectionery composition providing a first layer of the multi-layered rope and a second confectionery composition, different in at least one characteristic from the first confectionery composition, providing a second layer of the multi-layered rope; bulk-sizing the multi-layered rope; and wherein a temperature of the first confectionery composition immediately prior to the step of bulk-sizing the multi-layered rope is a substantially homogenous temperature.

In a more particular implementation, the substantially homogenous temperature has a tolerance level of plus or minus 5 degrees Celsius. In a more particular embodiment, the substantially homogenous temperature has a tolerance level of plus or minus 3 degrees Celsius. These methods may further include a step of pre-extruding the first confectionery composition prior to the step of co-extruding the multi-layered rope to increase the homogeneity of the temperature of the first confectionery composition prior to the step of co-extruding. The step of pre-extruding may include recycling a portion of the first confectionery composition such that at least a portion of the first confectionery composition is pre-extruded more than once to increase the temperature homogeneity of the first confectionery composition prior to the step of co-extruding. At least 25 percent of the output of the step of pre-extruding may be recycled. At least 50 percent of the output of the step of pre-extruding may be recycled. At least 75 percent of the output of the step of pre-extruding may be recycled.

These methods may further include the step of producing the first confectionery composition using a batch production process and further comprising the step of storing a portion of the first confectionery composition for less than about 2 hours and greater than about 10 minutes prior to the step of pre-extruding. Alternatively, the step of storing the first confectionery composition for less than about 1 hour prior to the step of pre-extruding.

When the first confectionery composition is a gum composition, the substantially homogenous temperature may be about 50 degrees Celsius in one embodiment. In alternative embodiments, the substantially homogenous temperature of the gum composition is selected from the group consisting of 45, 46, 47, 48, 49, 50, 51, 52, 53, 54 and 55 degrees Celsius.

When the first confectionery composition is a candy composition, the substantially homogenous temperature is about 35 degrees Celsius in one embodiment. In alternative embodiments, the substantially homogenous temperature of the gum composition is selected from the group consisting of about 30, 31, 32, 33, 34, 35, 36, 37, 38, 39, and 40 degrees Celsius.

In some embodiments, the methods include a desired temperature differential between various ones of the confectioner compositions prior to co-extruding into a plurality of layers. One such method includes forming a multi-layered confectionery composition comprising the steps of co-extruding a multi-layered rope including a first confectionery composition providing a first layer of the multi-layered rope and a second confectionery composition, different in at least one characteristic from the first confectionery composition, providing a second layer of the multi-layered rope; and wherein the first confectionery composition has a first temperature immediately prior to the step of co-extruding and the second confectionery composition has a second temperature immediately prior to the step of co-extruding, and wherein a temperature difference between the first and second temperatures is no greater than a predetermined temperature differential.

In one embodiment, the predetermined temperature differential is less than 20 degrees Celsius. In a further embodiment, the predetermined temperature differential is less than 15 degrees Celsius. In a further embodiment, the predetermined temperature differential is less than 10 degrees Celsius. In alternative embodiments, the predetermined temperature differential is about 1, 2, 3, 4, 5, 6, 7, 8, 9, 10, 11, 12, 13, 14, 15, 16, 17, 18, 19, or 20 degrees Celsius.

Alternatively, a temperature differential between the various confectionery compositions may be maintained directly prior to the step of bulk sizing. One such method includes forming a multi-layered confectionery composition comprising the steps of co-extruding a multi-layered rope including a first confectionery composition providing a first layer of the multi-layered rope and a second confectionery composition, different in at least one characteristic from the first confectionery composition, providing a second layer of the multi-layered rope; bulk-sizing the multi-layered rope; and wherein the first confectionery composition has a first temperature immediately prior to the step of bulk-sizing and the second confectionery composition has a second temperature immediately prior to the step of bulk-sizing, and wherein a temperature difference between the first and second temperatures is no greater than a predetermined temperature differential.

In one embodiment, the predetermined temperature differential is less than 20 degrees Celsius. In a further embodiment, the predetermined temperature differential is less than 15 degrees Celsius. In a further embodiment, the predetermined temperature differential is less than 10 degrees Celsius. In alternative embodiments, the predetermined temperature differential is about 1, 2, 3, 4, 5, 6, 7, 8, 9, 10, 11, 12, 13, 14, 15, 16, 17, 18, 19, or 20 degrees Celsius.

Methods according to the present invention may also include matching viscosities of various layers, and particularly adjacent layers to provide for improved adhering between the layers as well as sizing of the multi-layered composition. One embodiment one such method includes a method of forming a multi-layered confectionery composition comprising the steps of co-extruding a multi-layered rope including a first confectionery composition providing a first layer of the multi-layered rope and a second confectionery composition, different in at least one characteristic from the first confectionery composition, providing a second layer of the multi-layered rope; severing the multi-layered rope into individual pieces; wherein a first viscosity of the first confectionery composition is matched to a second viscosity of the second confectionery composition prior to the step of co-extruding the multi-layered rope.

Preferably, the viscosity of the second confectionery composition is about 95 percent of the viscosity of the first confectionery composition. Alternatively, the viscosity of the second confectionery composition may be about 90 percent of the viscosity of the first confectionery composition. However, the viscosity of the second confectionery composition is selected from the group consisting of about 80, 81, 82, 83, 84, 85, 86, 87, 88, 89, 90, 91, 92, 93, 94 and 95 percent of the viscosity of the first confectionery composition.

These methods may further include a step of pre-extruding the first confectionery composition prior to the step of co-extruding the multi-layered rope to provide the first confectionery composition with a first viscosity within a desired viscosity range. The step of pre-extruding includes recycling a portion of the first confectionery composition such that at least a portion of the first confectionery composition is pre-extruded more than once to increase the homogeneity of the first viscosity. These methods may further include a step of producing the first confectionery composition using a batch production process and further comprising a step of storing a portion of the first confectionery composition for less than about 2 hours.

Another method according to the present invention may also include matching viscosities of various layers, and particularly adjacent layers, to provide for improved adhering between the layers as well as sizing of the multi-layered composition, where the matched viscosities are determined prior to bulk-sizing. One such method includes a method of forming a multi-layered confectionery composition comprising the steps of co-extruding a multi-layered rope including a first confectionery composition providing a first layer of the multi-layered rope and a second confectionery composition, different in at least one characteristic from the first confectionery composition, providing a second layer of the multi-layered rope; bulk-sizing the multi-layered rope; severing the multi-layered rope into individual pieces; and wherein a first viscosity of the first confectionery composition is matched to a second viscosity of the second confectionery composition prior to the step of bulk-sizing the multi-layered rope.

Preferably, the viscosity of the second confectionery composition is about 95 percent of the viscosity of the first confectionery composition. Alternatively, the viscosity of the second confectionery composition may be about 90 percent of the viscosity of the first confectionery composition. However, the viscosity of the second confectionery composition is selected from the group consisting of about 80, 81, 82, 83, 84, 85, 86, 87, 88, 89, 90, 91, 92, 93, 94 and 95 percent of the viscosity of the first confectionery composition.

These methods may further include a step of pre-extruding the first confectionery composition prior to the step of co-extruding the multi-layered rope to provide the first confectionery composition with a first viscosity within a desired viscosity range. The step of pre-extruding includes recycling a portion of the first confectionery composition such that at least a portion of the first confectionery composition is pre-extruded more than once to increase the homogeneity of the first viscosity. These methods may further include a step of producing the first confectionery composition using a batch production process and further comprising a step of storing a portion of the first confectionery composition for less than about 2 hours.

During the processing of the multi-layered confectionery composition, some of the multi-layered confectionery composition may become salvage and there is thus a need to prevent this salvage from being wasted. Therefore, one such method according to the invention includes a method of forming a multi-layered confectionery composition comprising the steps of combining a first confectionery composition with a second confectionery composition to form a multi-layered rope wherein the first confectionery composition provides a first layer of the multi-layered rope and the second confectionery composition, different in at least one characteristic from the first confectionery composition, provides a second distinct layer of the multi-layered rope; severing the multi-layered rope into individual pieces; and recycling a portion of the multi-layered rope such that it is passed through the step of combining a first confectionery composition with a second confectionery composition to form a multi-layered rope.

One particular embodiment relating to salvage further includes producing the first confectionery composition including mixing a plurality of ingredients in at least one first mixer to produce the first confectionery composition; producing the second confectionery composition including mixing a plurality of ingredients in at least one second mixer to produce the second confectionery composition; and wherein the step of recycling includes adding the recycled portion into the at least one first mixer and/or at least one second mixer. Preferably, the recycled portion provides no more than 20% by weight of the ingredients mixed in the at least one first mixer and/or at least one second mixer. Even more preferably, the recycled portion provides no more than 10% by weight of the ingredients mixed in the at least one first mixer and/or at least one second mixer. Even more preferably, the recycled portion provides no more than 1, 2, 3, 4 or 5% by weight of the ingredients mixed in the at least one first mixer and/or at least one second mixer.

In one embodiment, the first confectionery composition is a gum composition. In one embodiment, the second confectionery composition is a candy composition.

In one embodiment, the first confectionery composition has a different viscosity than the second confectionery composition and the step of recycling the multi-layered rope does not alter the viscosity of the first or second confectionery composition to which the recycled portion is added by more than 10 percent as compared to if the recycle had never been added.

In one embodiment, the first confectionery composition has a different elasticity than the second confectionery composition and wherein the step of recycling does not alter the elasticity of the first or second confectionery composition to which the recycled portion is added by more than 10 percent as compared to if the recycle had never been added.

Some methods further include the step of pre-extruding, with a pre-extruder, the first confectionery composition prior to the step of combining a first confectionery composition with a second confectionery composition to form a multi-layered rope. The step of recycling the multi-layered rope includes adding the recycled portion into the pre-extruder such that at least a portion of the recycled portion is pre-extruded at least twice.

Some methods may utilize multiple sizing steps so as to perform bulk sizing and then perform further more precise sizing of the multi-layered rope. One such embodiment includes a method of forming a multi-layered confectionery composition comprising the steps of combining a first confectionery composition with a second confectionery composition to form a multi-layered rope wherein the first confectionery composition provides a first layer of the multi-layered rope and the second confectionery composition, different in at least one characteristic from the first confectionery composition, provides a second distinct layer of the multi-layered rope; bulk-sizing the multi-layered rope such that a first dimension of the multi-layered is not at a desired dimension; conditioning of the multi-layered rope, after the step of bulk-sizing; and finish-sizing the multi-layered rope, after the step of conditioning, such that the first dimension of the multi-layered rope is at or proximate the desired dimension.

In one embodiment, the step of bulk-sizing places the first dimension at 80% of the desired dimension. In a further embodiment, the step of bulk-sizing places the first dimension at 85% of the desired dimension. In another embodiment, the step of bulk-sizing places the first dimension at 90% of the desired dimension. In another embodiment, the step of bulk-sizing places the first dimension at 95% of the desired dimension.

In one embodiment, the first dimension is within 5% of the desired dimension after the step of finish sizing. In a further embodiment, the first dimension is within 1, 2, 3 or 4% of the desired dimension after the step of finish sizing.

In one embodiment, the bulk-sizing and finish sizing are performed by a same type of sizing. In a preferred embodiment, the bulk-sizing and finish sizing is rope-sizing.

To prevent starving or over-feeding the co-extruder so as to provide an initial multi-layered rope having undesirable dimensions or voids, one method according to the present invention includes a method of forming a multi-layered confectionery composition comprising the steps of co-extruding, with a co-extruder, a multi-layered rope including a first confectionery composition providing a first layer of the multi-layered rope and a second confectionery composition, different in at least one characteristic from the first confectionery composition, providing a second layer of the multi-layered rope; and feeding, prior to the step of co-extruding, the first confectionery composition into the co-extruder at a desired feed rate.

In a preferred embodiment, the feeding of the first confectionery composition does not vary from the desired rate by more than 10%. In a more preferred embodiment, the feeding of the first confectionery composition does not vary from the desired rate by more than 5%. In one embodiment, the co-extruder includes an ingredient input through which the first confectionery composition is fed, the ingredient input has at least one sensor for analyzing the rate at which the first confectionery composition is fed into the co-extruder. In one more particular embodiment, the sensor is a load cell that senses the weight of the amount of the first confectionery composition within the ingredient input.

In a more particular embodiment, a method further comprises the step of adjusting the rate at which the first ingredient is fed into the ingredient input when the weight is outside of a predetermined weight range. The step of adjusting the rate may be performed by slowing down a rate at which loaves of the first confectionery composition are added to the ingredient input.

In a further more particular embodiment, the method further comprises the step of pre-extruding a first confectionery composition rope of the first confectionery composition and wherein the first confectionery composition rope is fed continuously into the ingredient input, wherein the step of adjusting the rate is performed by lengthening the feed path along which the first confectionery composition rope travels. The step of lengthening the feed path may include causing the feed path to be come a serpentine shape.

In one embodiment, the co-extruder includes an ingredient input through which the first confectionery composition is fed and the method includes the step of adding additional discrete portions of the first confectionery composition into the ingredient input when the feed rate is too slow.

Again to prevent sticking of the multi-layered rope or individual confectionery compositions to the processing equipment, embodiments of the present invention include using anti-adhesive processing aids. One embodiment includes a method of forming a multi-layered confectionery composition comprising the steps of combining a first confectionery composition with a second confectionery composition to form a multi-layered rope wherein the first confectionery composition provides a first layer of the multi-layered rope and the second confectionery composition, different in at least one characteristic from the first confectionery composition, provides a second distinct layer of the multi-layered rope, each of the first and second layers being visible; applying an anti-adhesive processing aid to the multi-layered rope; sizing the multi-layered rope, after applying the anti-adhesive processing aid; and wherein the step of applying the anti-adhesive processing aid mutes a visual distinction between the first and second layers by no more than 10%.

In a more particular implementation, the anti-adhesive processing aid is a clear anti-adhesive processing aid such that it provides substantially no obscuring effect to the visual distinction between the first and second layers. In one embodiment, the anti-adhesive processing aid is liquid mineral oil. In an alternative embodiment, the anti-adhesive processing aid is a powder, wherein the anti-adhesive processing aid is applied at a rate less than a normal rate.

In some embodiments, the various layers of the multi-layered confectioner composition include a candy composition. One embodiment includes a method of forming a multilayered confectionery composition comprising the steps of combining a first confectionery composition with a second confectionery composition to form a multi-layered rope wherein the first confectionery composition provides a first layer of the multi-layered rope and the second confectionery composition, different in at least one characteristic from the first confectionery composition, provides a second distinct layer of the multi-layered rope; and wherein the second confectionery composition is a candy composition.

In one embodiment, the ingredients forming the candy composition include at least 20% fondant by weight of the ingredients in an unmixed state, wherein after mixing of the ingredients, the fondant is homogenously mixed into the candy composition such that it is no-longer detectable within the candy composition.

In one embodiment, the ingredients forming the candy composition include at least 10% fondant by weight of the ingredients in an unmixed state, wherein after mixing of the ingredients, the fondant is homogenously mixed into the candy composition such that it is no-longer detectable within the candy composition.

In one embodiment, the ingredients forming the candy composition include at least 5% fondant by weight of the ingredients in an unmixed state, wherein after mixing of the ingredients, the fondant is homogenously mixed into the candy composition such that it is no-longer detectable within the candy composition.

In one embodiment, the method further comprises the step of bulk-sizing after the step of combining. The step of combining is performed by co-extruding, and wherein the candy composition is at least 75% crystallized prior to the step of bulk-sizing.

In one embodiment, the method further comprises the step of bulk-sizing after the step of combining. The step of combining is performed by co-extruding, and wherein the candy composition is at least 85% crystallized prior to the step of bulk-sizing.

In one embodiment, the method further comprises the step of bulk-sizing after the step of combining. The step of combining is performed by co-extruding, and wherein the candy composition is at least 90% crystallized prior to the step of bulk-sizing.

In one embodiment, the method further comprises the step of bulk-sizing after the step of combining. The step of combining is performed by co-extruding, and wherein the candy composition is at least 95% crystallized prior to the step of bulk-sizing.

In one embodiment, the method further comprises the step of bulk-sizing after the step of combining. The step of combining is performed by co-extruding, and wherein the candy composition is at least 97.5% crystallized prior to the step of bulk-sizing.

In one embodiment, the method further comprises the step of bulk-sizing after the step of combining. The step of combining is performed by co-extruding. The method further includes the step of conditioning after the step of co-extruding wherein the candy composition is at least 85% crystallized after the step of conditioning.

In one embodiment, the method further comprises the step of bulk-sizing after the step of combining. The step of combining is performed by co-extruding. The method further includes the step of conditioning after the step of co-extruding wherein the candy composition is at least 90% crystallized after the step of conditioning.

In one embodiment, the method further comprises the step of bulk-sizing after the step of combining. The step of combining is performed by co-extruding. The method further includes the step of conditioning after the step of co-extruding wherein the candy composition is at least 95% crystallized after the step of conditioning.

In one embodiment, the method further comprises the step of bulk-sizing after the step of combining. The step of combining is performed by co-extruding. The method further includes the step of conditioning after the step of co-extruding wherein the candy composition is at least 97.5% crystallized after the step of conditioning.

Chrystillinity may be determined by measuring crystalline particle sizes. These particle sizes may have an average particle size of less than 30 micrometers. Further, these crystalline particles may have an average particle size of between about 1 and 25 micrometers.

In some embodiments, the individual pieces may not be individually wrapped, but may be dispensed unwrapped directly into a bulk packages. As such, the individual pieces may come into contact with one another. However, by incorporating both gum and candy compositions in various multi-layered confectioner compositions, some embodiments include methods of eliminating or reducing sticking of individual pieces when stored in a bulk package in unwrapped states.

One method includes a method of forming a multi-layered confectionery composition comprising the steps of co-extruding a first confectionery composition with a second confectionery composition to form a multi-layered rope wherein the first confectionery composition provides a first layer of the multi-layered rope and the second confectionery composition, different in at least one characteristic from the first confectionery composition, provides a second distinct layer of the multi-layered rope; and cutting pieces from the multi-layered rope; and further comprising the step of forming the multi-layered rope to have at least one curved surface such that the individual pieces have at least one surface that is curved.

In one embodiment, the at least one surface that is curved is formed entirely by the first confectionery composition. In another embodiment, the at least one surface that is curved is formed by both the first and second confectionery compositions.

In one embodiment, each individual piece has a substantially constant width and a substantially constant length and a thickness that varies when traveling along its width. The width being less than the length. In one embodiment, the thickness is crowned such that the thickness at two opposed sides defining the width is less than a thickness laterally between and spaced from the two parallel sides. In some embodiments, the thickness is crowned such that the thickness at two opposed sides defining the length is less than a thickness laterally between and spaced from the two parallel sides. In a further embodiment, the thickness is substantially constant in a direction extending generally perpendicular to the crown.

In one embodiment, the thickness is a curved profile and varies by at least 5% from its smallest value to its greatest value.

In one embodiment, s 174-178, the thickness is crowned on opposed surfaces of the individual piece, the opposed sides facing away from one another.

In a further embodiment, each individual piece is cylindrical and wherein each layer is visible, and each layer includes at least one planar surface. This surface will be adjacent to a planar surface of an adjacent layer.

In one embodiment, the pieces include a third layer. The first and third layers sandwiching the second layer therebetween. The first and second layers are formed from the first confectionery composition. All three layers are visible and form at least a portion of the circular cross-section of the cylindrical pieces.

The prior aspects, objectives, advantages and embodiments can be used, where appropriate, combined or used together to provide further aspects, objectives, advantages and embodiments.

Other aspects, objectives and advantages of the invention will become more apparent from the following detailed description when taken in conjunction with the accompanying drawings. Further, many of these aspects and embodiments are identified separately. However, these embodiments may be used together where appropriate.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6 is a schematic representation of a final piece of a multi-layered confectionery composition formed using the process of FIG. 2 and system of FIGS. 1A and 1B;

FIG. 7 is a schematic representation of a rigid package including rows of the pieces of FIG. 6 inserted therein;

FIGS. 9 and 10 are schematic representations of ways of cutting pieces of the multi-layered confectionery composition from the multi-layered rope formed during the process of FIG. 2 using the system of FIGS. 1A and 1B.

Figure 1:
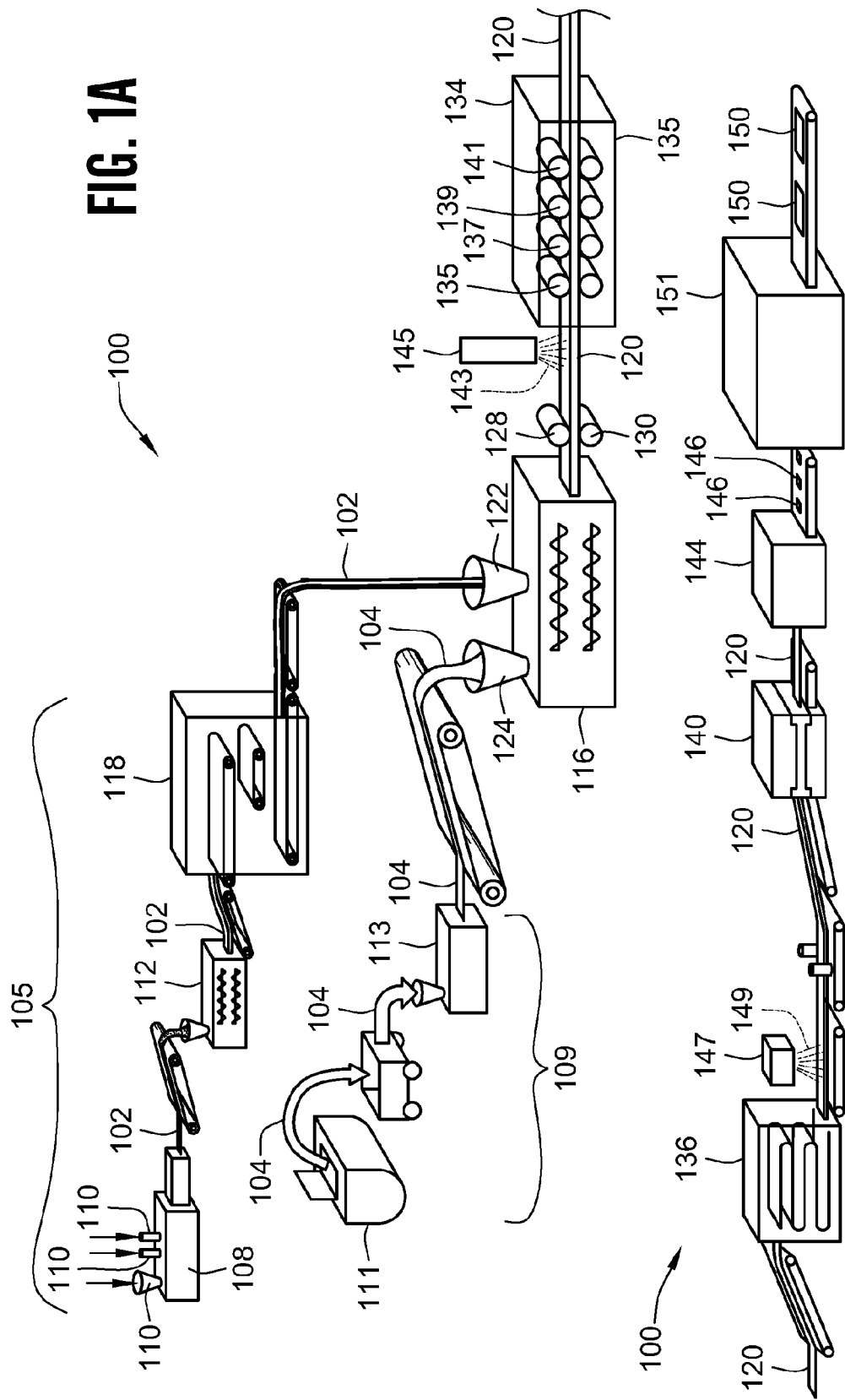
FIGS. 1A and 1B combine to illustrate a simplified schematic representation of a confectionery processing system for forming multi-layered confectionery compositions.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Disclosed herein are improvements in methods and manufacturing systems for producing confectionery compositions formed from multiple different confectionery compositions. The multiple confectionery compositions are arranged in a plurality of layers to form a multilayered confectionery composition. The different confectionery compositions forming the multilayered confectionery composition differ in at least one characteristic to provide an improved consumer experience. The different characteristic between the different confectionery compositions may be, either aesthetic or physical to provide visual, functional or taste/sensorial-based distinctions between the various layers so as to enhance the overall user experience in consuming the multilayered confectionery composition.

Thus, at least two different confectionery compositions, differing from one another in at least one characteristic, will be included, in substantially distinct layers, in the final multilayered confectionery composition.

While not necessary, a first confectionery composition in the multi-layered confectionery composition will typically be a gum composition. A second confectionery composition in the multi-layered confectionery composition will typically be, but not in all embodiments, a candy composition. However, it is contemplated that other embodiments may not include any gum composition and even further embodiments may be formed exclusively from gum compositions. Again, however, the different confectionery compositions will vary in at least on characteristic to provide new and improved user experiences when consuming the multi-layered confectionery composition.

Unfortunately, when combining confectionery compositions, which vary in at least one characteristic, into a single confection, various processing issues can occur. For instance, embodiments of the present invention relate to overcoming problems such as separation of different layers, formation of consistent and user desired piece shapes and sizes, avoiding sticking of different ones of the layers to other pieces or to a wrapper, avoiding shape or product migration during or after the manufacturing process, as well as preventing masking or subduing the visual or taste based benefits of the multiple confectionery compositions added to the finished confection.

By combining different confectionery compositions, multilayered confectionery compositions having improved characteristics including varying flavor profiles, textures, flavor release characteristics, functional ingredients, visual appeal, etc. can be manufactured to meet the demands of consumers or to otherwise provide an enhanced consumer experience. By providing, in preferred embodiments, both a candy layer and a gum layer, the multilayered confectionery composition can provide the instant flavor gratification of a candy, but it will still provide a long lasting flavor product of a gum.

Particular combinations of various multilayered confectionery compositions as well as individual confectionery compositions that may be used in various layers of the multilayered confectionery compositions formed by the methods and apparatus disclosed herein are illustrated in International Application No. PCT/US09/42478 filed May 1, 2009, and entitled: SUGAR FREE ISOMALT CONFECTIONERY AND METHODS OF MAKING; International Application No. PCT/US09/42557 filed May 1, 2009, and entitled: MULTILAYERED SUGAR FREE ISOMALT CONFECTIONERY AND METHODS OF MAKING SAME; International Application No. PCT/US2009/042468 filed May 1, 2009, and entitled: SUGAR FREE MANNITOL CONFECTIONERY AND METHODS OF MAKING SAME; International Application No. PCT/US09/42524 filed May 1, 2009, and entitled MULTILAYERED SUGAR FREE MANNITOL CONFECTIONERY AND METHODS OF MAKING SAME; International Application No. PCT/US09/42495 filed May 1, 2009, and entitled SUGAR FREE POLYOL CONFECTIONERY AND METHODS OF MAKING SAME; International Application No. PCT/US09/42573 filed May 1, 2009, and entitled MULTILAYERED SUGAR FREE POLYOL CONFECTIONERY AND METHODS OF MAKING SAME, the teaching and disclosures of which are hereby incorporated herein in their entireties by reference thereto.

Further yet, in some embodiments, the gum composition may be used to mix with or absorb some of the flavor or sensorial components that may be initially carried with the candy composition when the user chews the multilayered confectionery composition. As the candy composition is continuously mixed into or entrapped in the chewable portion (i.e. elastomeric portion or structure) of the multilayered confectionery composition to delay the consumption of the candy composition.

Unfortunately, when combining confectionery compositions having different physical properties, such as visco-elastic properties as well as thermal properties, production of the individual confectionery compositions and then simply layering the compositions is not merely what must be considered when forming such multilayered confectionery compositions.

This becomes even more significant when attempting to use standard rigid packaging such as current commercially successful rigid packaging such as cardboard packaging, because tolerancing of the dimensional size of the individual pieces can be difficult when required to consider the various physical properties, and sometimes conflicting properties, of the various confectionery compositions of the resulting multilayered confectionery compositions.

GENERAL OVERVIEW OF PROCESSING STEPS AND SYSTEM

The processing steps and machinery of an embodiment of an exemplary system of the present invention will first be described and then more particular features of the processes and systems of more specific embodiments will be highlighted. Further, non-limiting and non-exhaustive alternative arrangements will also be discussed.

Figure 2:
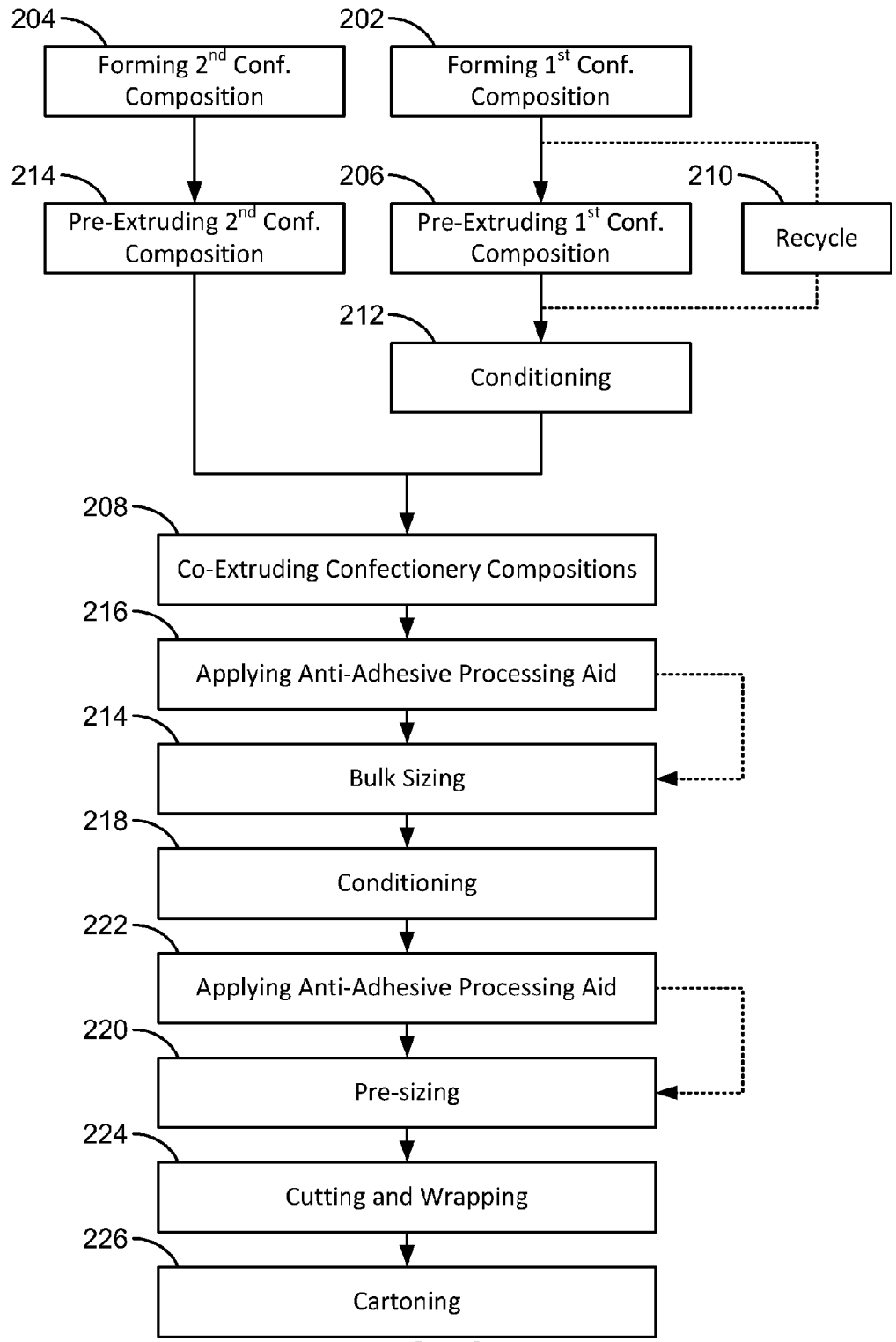
FIG. 2 is a simplified flow chart of a representative method illustrating the processing steps for forming a multi-layered confectionery composition using the system of FIGS. 1A and 1B.

In accordance with an embodiment of the present invention, FIGS. 1A and 1B (referred to in combination as FIG. 1) illustrate a schematic representation of the processing equipment for a processing system 100 for forming confectionery compositions and FIG. 2 is a simplified flow chart of the principle processing steps of embodiments of methods of the present invention.

The confectionery processing system 100 generally includes processing equipment for performing the steps of forming 202, 204 the various confectionery compositions 102, 104 that will be combined to form the multilayered confectionery composition 120 forming the end product. The representative system 100 is configured for forming a multilayered confectionery composition that includes only two different confectionery compositions.

Thus, there are two sets of equipment for initially forming 202, 204 the confectionery compositions 102, 104. It will be appreciated that more than two different confectionery compositions can be used in the multi-layered confectionery composition. In those embodiments, when more than two different confectionery compositions are combined into the multilayered confectionery composition, more than two sets of processing equipment will typically be used during upstream process to form the individual confectionery compositions.

However, it should be noted that when only small differences exist between the different confectionery compositions, some or all of the equipment for forming one of the different confectionery compositions may be used to form parts of or all of the other different confectionery compositions. For instance, if the only difference between the different compositions is the color, and if the color ingredient can be added at the end, the same equipment may be used to bulk produce the product absent the coloring. The coloring can then be added to different portions of the bulk product to produce the two separate confectionery compositions. However, it will be appreciated that substantially all, if not all, of the same equipment may be used to form the two different confectionery compositions.

For purposes of explanation, the first confectionery composition 102 will be described as a gum composition (thus also referred to as gum composition 102). Thus, the first set of confectionary forming equipment, identified generally at 105, is gum processing equipment. However, in other embodiments, the first confectionery composition need not be a gum composition.

Figure 3:
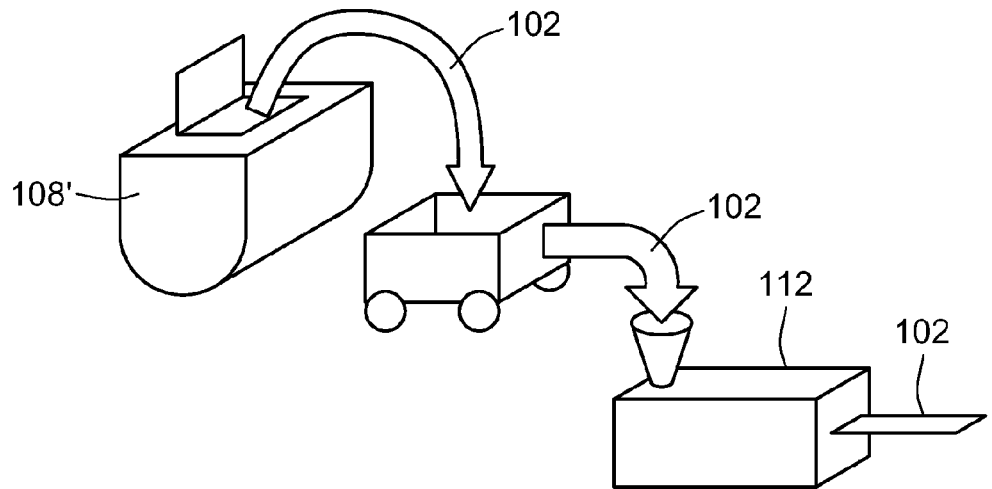
FIG. 3 is an alternative arrangement for forming one of the confectionery compositions within the system of FIGS. 1A and 1B.

In the illustrated embodiment, typical gum processing equipment may be used to form the confectionery composition 202 that is in the form of a gum structure that forms one or more portions or layers of the multi-layered confectionery composition. As illustrated, the gum processing equipment is provided, for example, by a continuous gum mixer 108 (which may also be referred to as a "processor"), typically in the form of an extruder, used to form a gum composition in a continuous one step process. However, in alternative embodiments, such as illustrated in FIG. 3, the gum processing equipment may be provided by a batch mixer arrangement 108'. Representative non-limiting examples of continuous gum mixers, batch gum mixers, or hybrids thereof are disclosed in U.S. Provisional Patent Application Nos. 61/016,016; 61/036,626; and 61/045,764, filed Dec. 21, 2007; Mar. 14, 2008; Apr. 17, 2008, respectively, which are assigned to the present assignee, the disclosures of which are hereby incorporated by reference in their entireties.

As illustrated in FIG. 1, the continuous gum mixer 108 includes, for example, a plurality of gum ingredient inputs 110 along its length for receipt of gum base and other gum ingredients such as flavorings, sugars, sweeteners, fillers, various agents, and the like. The gum structure may be any number of a plurality of different types of gum structures, but will typically include, at least, the elastomeric portion of a gum that provides for the continuous or prolonged chewability of the multilayered confectionery composition when other soluble ingredients or other ones of the confectionery compositions, different than the gum composition, are progressively ingested or otherwise consumed by the consumer. The chewable portion provided by the gum composition provides for a prolonged chewing experience for the user.

Most typically, however, if the gum composition is not a finished gum, the gum composition will include, at least, a finished gum base and one or more sensorial ingredients such as flavors or sweeteners, but may not include all of the gum ingredients such that the gum composition would typically be understood as a finished gum. However, other compositions are clearly contemplated and the embodiments of the invention disclosed herein are not limited to any particular gum composition provided it provides for the prolonged chewability, thus includes some form of an elastomer or rubber like compound known to be used in gum compositions.

The output from the gum mixer 108 may be generally irregular or otherwise non-uniform in shape in that it often will be output in an uneven stream of material having a non-uniform cross-section. The same can be said of the output of a batch mixer arrangement 108', as illustrated in FIG. 3 in that it is generally irregularly shaped without a consistent cross-section. Alternatively, and particularly when using a batch mixing arrangement, the resulting gum composition 102 may have an inconsistent non-shape related physical property such as temperature profile or even non-uniform mixing of the ingredients.

After forming the gum composition 102, the process includes pre-extruding 206 the gum composition 102. As such, the output of the gum mixer, i.e. continuous gum processor 108 is then fed into a pre-extruder 112.

When a batch mixing system 108' is used, the entire bulk gum composition is finished, typically, all at once. However, if no further processing occurs on the gum composition 102 prior to being added to the co-extruder 116 and formed into the multilayered confectionery composition during the step of co-extruding 208, the portion of the gum composition 102 that is used first will be at a different temperature than that portion of the gum composition 102 that is stored as it awaits being processed into the multilayer confectionery composition, which can introduce undesirable process variations.

In one implementation, the pre-extruder 112 produces one or more ropes of the gum composition 102 that are substantially uniform in physical properties, such as visco-elastic properties and temperature. Each individual rope that is dispensed from the pre-extruder 112 will have a substantially constant cross-section for more uniform feeding of downstream processing equipment, such as the co-extruder 116.

Figure 4:
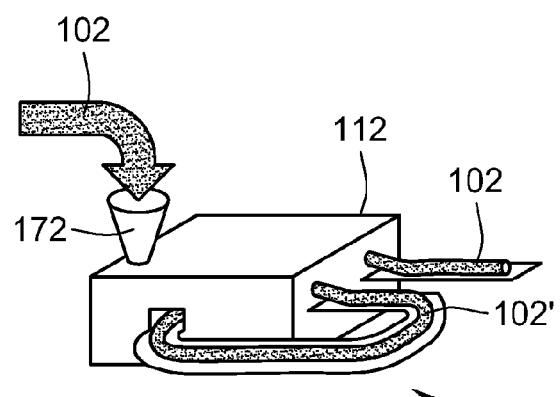
FIG. 4 is a simplified illustration of a representative pre-extruder including a recycle arrangement for use in the system of FIGS. 1A and 1B.

As illustrated in FIG. 4, the pre-extruder 112 may include a recycle arrangement 114 or pump around arrangement that returns a predetermined portion of the gum composition (illustrated with reference numeral 102' in FIG. 4) back into the beginning of the pre-extruder 112 such that at least a portion of the gum composition 102 must make more than one pass through the pre-extruder 112 prior to any further downstream processing.

This step of recycling 210 a portion 102' of the gum composition 102 further facilitates increased work being added to the gum composition 102 to promote increased consistency in the portion of the gum composition 102 that is allowed to transition downstream to further processing equipment. For example, but not limiting, the recycle arrangement 114 can be used to provide more uniform temperature as well as increased or more uniform mixing of the gum composition 102 to avoid variation in physical properties of the gum composition 102, and particularly, the visco-elastic properties. This provides a significant advantage in maintaining precise tolerances of the size of pieces of the multilayered confectionery composition produced by the processing system 100. Further, also as the gum composition 102 will be formed into one or more layers adhered to another gum composition, the uniformity in physical properties promotes consistent and predictable adhering of the different layers.

For instance, it is desired to have the temperature of the gum composition 102 substantially homogenous immediately prior to the step of co-extrusion such that a consistent extrusion profile is provided. In some embodiments, it may be desired to have no more than 5 degree Celsius variation from a desired temperature. More preferably, it is desired to have no more than 3 degree Celsius variation from a desired temperature. And even more preferably, it is desired to have no more than 1 degree Celsius variation from a desired temperature.

When the confectionery composition is a gum composition this homogenous temperature is a desired temperature of about 45, 46, 47, 48, 49, 50, 51, 52, 53, 54, 55 degrees Celsius and/or ranges therebetween, but preferably between about 48 and 52 degrees Celsius.

Homogeneity of the temperature of a candy composition 104 is also desired. This homogenous temperature is a desired temperature of about 30, 31, 32, 33, 34, 35, 36, 37, 38, 39, 40 degrees Celsius and/or ranges therebetween, but preferably between about 33 and 37 degrees Celsius.

To further promote homogeneity of the temperature of the gum composition prior to the step of co-extrusion 208, the confectionery composition is preferably prevented from sitting (i.e. being stored) for more than 2 hours prior to being pre-extruded. More preferably, the confectionery composition is prevented from sitting more than 1 hour prior to being pre-extruded. Even more preferably, the confectionery composition is prevented from sitting more than 30 minutes prior to being pre-extruded.

Because the pre-extruder 112 also forms the gum composition 102 into a rope having substantially uniform cross-section, the step of pre-extruding 206 the gum composition 102 also facilitates conditioning of the rope(s) that proceed downstream for further processing. More particularly, in one embodiment, as illustrated in FIG. 1, a pre-conditioning station, illustrated in the form of pre-conditioning tunnel 118 is provided.

The pre-conditioning tunnel 118 is used for the step of conditioning 212 the gum composition 102 prior to downstream combination with the second confectionery composition 104, and again, to try and promote consistency in the gum composition 102 prior to it being processed by co-extruder 116.

The pre-conditioning tunnel 118 may be a single pass cooling tunnel. However, in alternative embodiments and as illustrated, the pre-conditioning tunnel 118 is a multi-pass conditioning tunnel that may include any number of passes. However, in even further embodiments, the multi-pass conditioning tunnel provides for 3-15 passes through the conditioning tunnel.

Rather than a fixed number of passes, the pre-conditioning tunnel 118 could include a loafing and conditioning system as illustrated in co-pending U.S. patent application Ser. No. 12/352,110, filed Jan. 12, 2009, assigned to the assignee of the instant application, the teachings and disclosures of which are hereby incorporated herein by reference thereto. This loafing and conditioning system could be positioned downstream of the pre-extruder 112 or could be in substitution of both the pre-extruder 112 and the pre-conditioning tunnel 118 as illustrated in FIG. 1.

In any event, the output of the gum processing equipment 105 should be consistent in composition, visco-elastic properties, as well as physical properties for proper downstream processing, and particularly, but not limited to, processing in the co-extruder 116.

The output of the pre-conditioning tunnel 118 or other conditioning system is then supplied to and fed into the multi-layered confectionery forming device illustrated in the form of a co-extruder 116 for further processing and formation into a co-extruded multilayered confectionery composition. Although the embodiment of FIG. 1 was illustrated with the conditioning system 118, the conditioning system is optional, and other embodiments may not include a conditioning system 118 before the co-extruder 116.

Prior to discussing the operation of the co-extruder 116, the parallel step(s) of forming 204 the second confectionery composition 104 will be discussed in conjunction with the second set of confectionery processing equipment. In the illustrated embodiment of FIG. 1, the second set of confectionery composition processing equipment is illustrated generally by reference numeral 109. This processing equipment 109 is used for the step of forming 204 the second confectionery composition 104 that is to be added to the multi-layered confectionery composition. For discussion of the illustrated example, the second confectionery composition 104 will be discussed as a chewy candy composition. The second confectionery composition 104 may therefore be referred to as a chewy candy 104. However, as noted previously, the second confectionery composition 104 is not so limited and could be a second gum composition or other confectionery composition. If it is a second gum composition, the second confectionery composition 104 will typically use substantially the same type of processing equipment as noted previously with regard to processing equipment 105.

In this example, the step of forming 204 the chewy candy composition 104 uses a batch system. Thus, confectionery processing equipment 109 is illustrated as a batch system including a batch mixing arrangement 111. The processing of the second confectionery composition 104 is typical candy processing including cooking of the candy composition and then standard pulling of the chewy candy. This process includes several cooking sequences as well as pulling sequences to form a chewy candy composition.

Once the chewy candy 104 is properly processed, it is transferred from the batch mixing equipment to a further pre-extruder 113. The step of pre-extruding 213 the second confectionery composition 104 with pre-extruder 113 processes the batch of chewy candy 104 to again provide more consistent physical properties to the chewy candy 104 as it is subsequently added to co-extruder 116. Again, it is desirable to have consistency for the chewy candy 104 in temperature, composition, and/or visco-elastic properties.

After the steps of generally producing the confectionery compositions and preparing them for formation of the multi-layered confectionery composition, the process includes the step of co-extruding 208 the confectionery compositions using co-extruder 116. By using a co-extruder 116, the multi-layered confectionery composition will initially be in the form of a continuous multi-layered rope 120. While illustrated schematically in FIG. 1A as a single layer rope, a more detailed illustration of the multi-layered rope 120 is illustrated in FIG. 5 (the embodiment of FIG. 5 includes three layers as will be explained in detail below.)

As illustrated in FIG. 1A, the co-extruder 116 has a pair of feed or storage towers 122, 124 that function as inputs for feeding the various different confectionery compositions. More particularly, storage tower 122 receives the first confectionery composition 102. Storage tower 124 receives the second confectionery composition 104. However, in other embodiments, such as where more than two confectionery compositions are being combined to form the multi-layered confectionery composition, the co-extruder 116 may include more storage or feed towers, i.e. one for each of the various confectionery compositions.

In some embodiments, a feed or storage tower need not be required for each layer of the multi-layered confectionery composition. In some instances, a single feed or storage tower may receive a confectionery composition that is used for multiple layers of a multi-layered confectionery composition. For instance, a same gum composition may be used to form two layers that sandwich a different candy layer therebetween (see for example FIG. 5). Thus, the same gum composition 102, which forms more than one layer of the multi-layered rope 120 is operably distributed through the co-extruder 116 to form two separate layers. This occurs for example, with reference to FIG. 5, where layers 121 and 125 are formed from the first confectionery composition 102 and the middle layer 123 is formed from the second confectionery composition 104.

Figure 5:
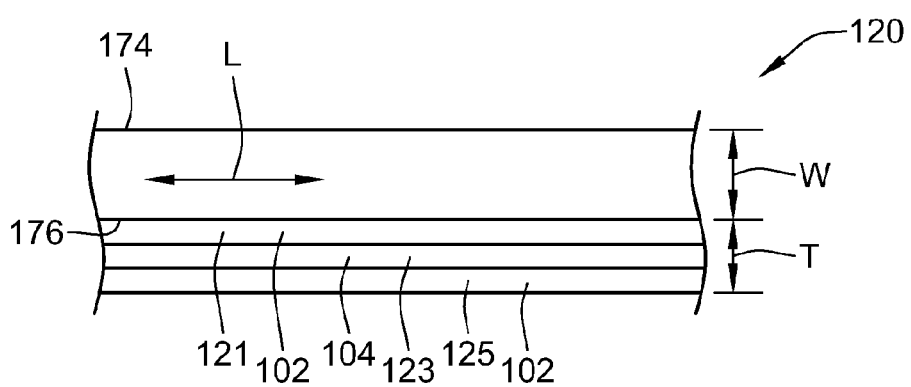
FIG. 5 is a schematic representation of a portion of a multi-layered rope of a representative multi-layered confectionery composition formed during the process of FIG. 2 using the system of FIGS. 1A and 1B.

As illustrated in FIG. 5, the layer 121 has a first surface in direct contiguous contact with a first surface of layer 123. Similarly, layer 125 has a first surface in direct contiguous contact with a second surface of layer 123, opposite the surface in contact with the layer 121. Each layer, in the illustrated embodiment is considered to be a non-concentric sheet.

Further, when a single feed port, i.e. storage tower, is used to supply a single confectionery composition into the co-extruder 116, but it is used for a plurality of layers, it is preferred that the pressure at the die end of the co-extruder is substantially uniform for each of the layers formed by the single confectionery composition 102. This uniform pressure prevents a non-uniform output from the co-extruder 116 for the two different layers. This is particularly true when the multiple layers have substantially identical dimensions. When the layers have the same size and are exposed to different pressures, one layer will be extruded at a faster rate than the other causing deformation in the multi-layered rope 120, which may be in the form of poor adhesion between the various layers of the multi-layered confectionery composition or in a non-uniform profile for the multi-layered rope 120. Alternatively, if different pressures are experienced by the different layers, voids may be generally formed in the multi-layered rope 120.

The various storage towers 122, 124, i.e. confectionery composition inputs into the co-extruder 116, may be axially, vertically or laterally offset from one another. As noted previously, in one embodiment, the second confectionery composition 104 forms a middle layer of the multi-layered confectionery composition. In the illustrated embodiment, the storage towers 122, 124 are axially offset along the co-extruder 116. However, the feed tower 124 maybe laterally offset from the flow path defined by the multi-layered rope 120 exiting the co-extruder 116. In this arrangement, the second confectionery composition is fed in from a side of the co-extruder at an oblique angle relative to the flow path and must make a bend in its direction of travel within the co-extruder 116. In further alternative embodiments, the various inputs into the co-extruder 116 may be vertically offset from one another such that they are generally fed into the co-extruder 116 at a same axial location along the co-extruder but at different vertical heights.

The co-extruder 116 is typically configured to have substantially discrete flow paths therethrough for each of the different confectionery compositions 102, 104 prior to passing through the extruder die. However, there need only be a single screw arrangement for each confectionery composition 102, 104, respectively. In other words, each layer need not have its own screw arrangement for driving the confectionery compositions 102, 104 through the co-extruder 116. However, it is contemplated that when a single confectionery composition is used for multiple layers that each layer could have its own dedicated screw arrangement for independently driving that portion of the confectionery composition through the co-extruder 116. It should be noted that a screw arrangement need not be a single screw, but could be a plurality of screws such as in a co- or counter-rotating double screw arrangement. To be a separate screw arrangement, it must be somehow separated from the other screw arrangements such that its action does not provide any significant addition to the driving of a different one of the confectionery compositions through the co-extruder 116.

Typically, as the multi-layered rope 120 exits the die of the co-extruder, the dimensions of the multi-layered rope 120 are significantly larger than the final dimensions of the individual pieces of the multi-layered confectionery composition. The multilayered rope 120 is typically sized larger than desired final dimensions to significantly reduce the force and energy required to push the different layers of product through the corresponding die of the co-extruder 116. Then, the large co-extruded multi-layered rope 120 can be sized using more efficient less energy demanding processes. As the end product is typically slab/stick gum that are generally rectangular pieces, the multilayered rope will typically have a generally rectangular cross-sectional profile.

It shall be appreciated that because the multi-layered rope 120 is a continuous rope, the dimension along the travel path (i.e. the length L of the multi-layered rope 120 as illustrated in FIG. 5) is effectively infinite. Further, depending on the downstream packaging equipment, the size of the multi-layered rope coming out of the co-extruder may also vary. If a cut-and-wrap system based on typical cut-and-wrap machinery is downstream from the co-extruder for forming the individual pieces of multi-layered confectionery, the width and height dimensions may be significantly smaller than if a rolling-and-scoring system based on typical rolling-and-scoring machinery is downstream from the co-extruder 116.

For instance, if a cut-and-wrap system, where pieces are directly severed from the multi-layered rope 120 and then wrapped and packaged, is used to form pieces of the multi-layered confectionery composition, with reference to FIG. 5, the initial width W of the multi-layered rope 120 may be between about twenty (20) mm to about fifty (50) mm as it exits the co-extruder 116. More preferably, the width W is between about twenty-five (25) mm to about forty (40) mm as the multi-layered rope exits the co-extruder 116. Even more preferably, the width W of the co-extruded, multi-layered rope is between about twenty-seven (27) mm and thirty-three (33) mm. These dimensions are used when the width W of the multi-layered rope 120 results in the final width FW of the finished piece 146 of the multi-layered confectionery composition through downstream sizing steps, as illustrated in FIG. 6. Further, these dimensions are used with a desired final width FW of the finished piece of between about ten (10) mm and thirteen (13) mm.

However, if the width W of the multi-layered rope 120 results in the final length FL of the finished piece 146 of the multi-layered confectionery composition different width W dimension values out of the co-extruder 116 may be desired. More particularly, the width W of the multi-layered rope 120 may be between about fifty (50) mm to about one-hundred fifty (150) mm as it exits the co-extruder 116. More preferably, the width W is between about sixty (60) mm to about one-hundred twenty (120) mm as the multi-layered rope exits the co-extruder 116. Even more preferably, the width W of the co-extruded, multi-layered rope is between about seventy (70) mm and one-hundred (100) mm. These dimensions are used when the width W of the multi-layered rope 120 results in the final length FL of the finished piece 146 of the multi-layered confectionery composition, as illustrated in FIG. 6. Further, these dimensions are contemplated to be used to form piece 146 having a desired final length FL of between about thirty (30) mm and forty (40) mm.

The initial thickness T of the multi-layered rope 120 may be between about ten (10) mm to about forty (40) mm as it exits the co-extruder 116. More preferably, the thickness T is between about fifteen (15) mm to about thirty (30) mm as the multi-layered rope exits the co-extruder 116. Even more preferably, the thickness T of the co-extruded, multi-layered rope 120 is between about twenty-one (21) mm and twenty seven (27) mm. These dimensions are used when the thickness T of the multi-layered rope 120 will result in the final thickness FT (see FIG. 6) of the finished piece 146 of the multi-layered confectionery composition, as illustrated in FIG. 120. Typically, thickness T will be used as the final thickness FT when forming a multi-layered confectionery composition. These thickness values are used when the desired final thickness FT of the piece is between about two (2) mm and seven (7) mm.

Alternatively, if the downstream packaging process includes traditional rolling and scoring, where the multi-layered rope 120 is not directly formed into the individual pieces and then wrapped, the multi-layered rope 120 will have a much different width W and thickness T dimensions. In this arrangement, the orifice of the co-extruder will be about one (1) inch by eighteen (18) inches so as to accommodate standard rolling and scoring machines. However, when using rolling and scoring of a multi-layered rope, the multi-layered rope 120 may not be able to withstand the larger compression forces of a standard rolling and scoring operation so as to get the thickness down to the desired final thickness FL of between about two (2) mm and seven (7) mm.

For instance, if too large a compression force is applied to the multi-layered rope 120, one of the layers may be more susceptible to the compression force and result in undesired lateral oozing of the material. More particularly, if the middle layer is a chewy candy, which will typically have a lower viscosity than the outer gum layers, the compression of the multi-layered rope may result in lateral oozing of the middle chewy candy layer rather than uniform compression of all layers of the multi-layered rope. Thus, the actual thickness out of the co-extruder may be reduced to less than one (1) inch so as to reduce the amount of rolling required to reduce the thickness T of the multi-layered rope 120 down to the desired final thickness FT.

It should be noted that the optimal rope width W and thickness T dimensions can vary depending on the actual confectionery compositions combined in the multi-layered rope 120. More particularly, the rope size may be tailored to the specific physical properties of the confectionery compositions and their abilities to and characteristics relating to bulk sizing.

As the multi-layered rope 120 is being extruded from co-extruder 116, the multi-layered rope 120 is passed through a pair of adhesion rollers 128, 130. The adhesion rollers 128, 130 improve the adhesion between the plurality of layers by pressing the plurality of layers together just downstream of the co-extruder 116. This added step reduces the occurrence of separation of the plurality of layers.

The multi-layered rope 120 is then passed through a bulk-sizer for the step of bulk, i.e. majority, sizing 214 of the multi-layered rope 120. The step of bulk sizing 214 is a forming process that transitions the large multi-layered rope 120 down to a smaller rope that has dimensions that are approximately the desired final width FW and final thickness FT of the multilayered rope prior to forming the individual pieces. In the illustrated embodiment, the bulk-sizer is in the form of a multi-roller rope-sizer 134. In one embodiment, the rope-sizer 134 will size the multi-layered rope 120 such that the width W and/or thickness T exiting the rope-sizer 134 are preferably at least seventy-five (75) percent of the corresponding final dimensions, more preferably eighty-five (85) percent and even more preferably ninety-five (95) percent of the corresponding final dimensions. When using cut and wrap, the rope-sizer 134 will preferably get the rope to two final dimensions of the pieces (i.e. thickness and width or length) while if using rolling-and-scoring, the rope-sizer 134 may get the rope to a single final dimension (i.e. thickness).

The rope-sizer 134 includes a plurality of successive pairs of rollers that progressively reduce the size of the multi-layered rope 120. The rope-sizer 134 is illustrated schematically as including four pairs 135, 137, 139, 141 of sizing rollers. However, alternative embodiments may have more or less pairs of sizing rollers. In a preferred embodiment, the rope-sizer 124 is a seven stage sizer having seven pairs of rollers for successively reducing the size of the multi-layered rope 120.

Unlike standard rolling-and-scoring rollers, the rope-sizer 134 operates to linearly stretch the multi-layered rope 120 along its flow path (i.e. length L), which simultaneously results in lateral contracting of the multi-layered rope 120 both along the width W as well as the thickness T of the multi-layered rope 120. The stretching is effectuated by successively accelerating the multi-layered rope 120 as it passes through the successive pairs of rollers. Each pair of sizing rollers 135, 137, 139, 141 operates at a faster linear speed along the flow path such that it is effectively "starved" of material such that each set of rollers 135, 137, 139, 141 "pulls" the multi-layered rope 120 to cause the three-dimensional stretching (one positive stretch and two negative stretches (i.e. contractions)) of the multi-layered rope 120.

In general, the rope-sizer 134 does not provide the significant externally applied compressive forces, e.g. along the thickness direction, such as provided by typical bulk sizing rollers used in gum sizing and is therefore a gentler type of bulk-sizer, particularly when viewed in that direction. This gentler action is provided by the Poisson effect due to the linear stretching of the multi-layered rope 120 along the length of the flow path which causes contraction along the thickness and width directions. In other words, the rope-sizer 134 utilizes transverse contraction strain to the extension strain in the direction of the stretching force to cause the contraction in the thickness T and width W directions.

It should be noted that the rollers can all have the same radial size and just operated at different angular velocities or alternatively could have varying radial sizes and operated at the same or even different angular velocities to effectuate the desired three-dimensional stretching. Further, both rollers of a given pair of rollers need not have the same dimensions.

To facilitate sizing of the multi-layered rope 120 (also referred to herein as the multi-layered confectionery composition 120) while avoiding deformation in the layered arrangement, i.e. to avoid formation of gaps or voids in various ones of the layers or alternatively lateral oozing of the corresponding layer, it is desired to have the visco-elastic properties of the confectionery compositions to be closely matched during the bulk-sizing process, and particularly when using a rope-sizer 134. When the properties of the confectionery compositions 102, 104 get too far out of match, methods of the present invention include adjusting the processing of one or more of the confectionery compositions to match desired ones of the physical properties of the confectionery compositions 102, 104. Thus, modifications to the processing of the multi-layered confectionery composition may affect only one, a plurality or all of the confectionery compositions that are combined to form the multi-layered confectionery composition 120.

For example, if the middle layer has significantly different viscosity or elasticity than the outer layers during the bulk sizing operation, the stretching effects will not be equally or even proportionally felt by each layer. Thus, when the outer layers are being engaged by the top and bottom roller of a pair of rollers, this loading will not be properly transferred through the interior layers. For instance, if the contraction in the width W direction is not transferred to the middle layer, the multi-layered rope will no longer remain substantially rectangular in cross-section because the middle layer will stay at its pre-stretched dimension while the outer layers will reduce in size.

Similarly, if the middle layer has a different elasticity than the outer layers problems may occur such as breaking of an individual layer resulting in malfunctioning of downstream operations or discontinuous sections within a given layer. For instance, if the middle layer is more inelastic than the outer layers, the outer layers may be stretched a desired amount along the length, but the middle layer cannot stretch a corresponding amount causing the middle layer to ultimately break. Additionally, the more elastic layer may contract in the width direction more than the other layer causing non-uniform contraction causing the layers to deviate in the width W direction. In some embodiments, this may actually be desired if it is desired to have non-prism shapes, i.e. shapes with partially rounded sides as will be more fully described below.

To promote uniform bulk-sizing or sizing in general, it is desirable to have a homogenous temperature of a given layer immediately prior to the step of bulk-sizing. The homogenous temperature will promote uniform visco-elastic properties of the given layer.

For instance, it is desired to have the temperature of the gum composition 102 substantially homogenous immediately prior to the step of bulk-sizing. In some embodiments, it may be desired to have no more than 5 degree Celsius variation from a desired temperature. More preferably, it is desired to have no more than 3 degree Celsius variation from a desired temperature. And even more preferably, it is desired to have no more than 1 degree Celsius variation from a desired temperature.

When the confectionery composition is a gum composition this homogenous temperature is a desired temperature of about 45, 46, 47, 48, 49, 50, 51, 52, 53, 54, 55 degrees Celsius and/or ranges therebetween, but preferably between about 48 and 52 degrees Celsius.

Homogeneity of the temperature of a candy composition 104 is also desired. This homogenous temperature is a desired temperature of about 30, 31, 32, 33, 34, 35, 36, 37, 38, 39, 40 degrees Celsius and/or ranges therebetween, but preferably between about 33 and 37 degrees Celsius.

While not immediately before the step of bulk sizing, the step of recycling can be used to maintain a homogenous temperature of the confectionery compositions 102, 104 both prior to the step of co-extruding as well as after the step of co-extruding but prior to the step of bulk-sizing.

Further, if one layer has a different viscosity than another layer, the pairs of rollers may merely compress only the less viscous layers causing the less viscous layer to ooze relative to the other layers rather than to have the desired contraction. For instance, if the outer layers are a viscous gum composition and the inner layers have a low viscosity, when the multi-layered rope passes through a given pair of rollers, the change in thickness T may provide a compressive force to the multi-layered rope causing the middle less viscous material too ooze laterally outward while the more viscous outer gum layers remain substantially the same thickness. Unfortunately, as noted above, the width W of the multi-layered rope 120 is decreasing as it passes through the pairs of rollers due to the linear stretching. Thus, if the middle layer does not similarly contract or, even worse, oozes thereby increasing the width of that particular layer, the desired cross-section of the multi-layered rope 120 is lost. Further yet, if the middle layer oozes out beyond the outer protective gum composition layers, it may undesirably interact with various downstream equipment causing debris and material build-up thereon. Again, while typically not desired, some embodiments may promote this orientation to provide for desired piece shapes.

In one embodiment, the lower viscosity layer may be extruded at a width that is slightly less than the widths of the higher viscosity layers in the event that less than equal contraction occurs for the less-viscous material than the higher viscosity materials.

When different layers consist of gum compositions and candy compositions, it can be desired to have predetermined temperature differentials between the different candy compositions. This is particularly true when the visco-elastic properties of the different candy compositions become similar (i.e. matched) with a given temperature differential therebetween. This can be understood because typically, when the temperature of a gum composition or a candy composition increases the viscosity decreases and the elasticity increases. Thus, if one temperature increases, i.e. for confectionery composition 102, it is also desirous to have a similar temperature change for confectionery composition 104. In other words, it is desirous to maintain some temperature differential therebetween.

In some embodiments of methods according to the present invention, it may be desirous to have a temperature differential of between about 1, 2, 3, 4, 5, 6, 7, 8, 9, 10, 11, 12, 13, 14, 15, 16, 17, 18, 19, and 20 degrees Celsius and/or ranges therebetween, particularly when the different confectionery compositions are candy and gum compositions. These temperature differentials may be desired immediately prior to the step of co-extruding or immediately prior to bulk-sizing or both.

To minimize and/or prevent sticking of the multi-layered rope 120 to the rope-sizer rollers 135, 137, 139, 141, the process includes the step of applying 216 an anti-adhesive processing aid 143 to the exterior of the multi-layered rope 120 prior to sizing operations. The anti-adhesive processing aid can also be referred to as an anti-sticking agent or a lubricant. Unlike standard gum anti-adhesive processing aids, such as powders including by way of non-limiting example, talc and mannitol, the Applicants have determined that it is preferred that the anti-adhesive processing aid 243 be substantially clear. As such, it is preferred to use an oil or fat in liquid form rather than the typical powder. The Applicants have determined that the use of the aforementioned powders will subdue or otherwise have a detrimental effect on the visual appearance of the multi-layered confectionery composition. As noted above, one of the significant advantages of the multi-layered confectionery composition, in some embodiments, is the improved visual appeal or experience provide to the consumer from the distinct layers. Therefore, the powdery, typically white, residue that is typically left by standard powder anti-adhesive agents is significantly undesirable. However, it should be noted, that not all embodiments of the present invention must utilize these non-powder or oil/fat based anti-adhesive processing aids 143, because the multi-layered confectionery compositions can have numerous other advantages beyond just the layered visual appeal.

In one embodiment, the anti-adhesive processing aid is a light mineral oil. However, other anti-adhesive processing aids may be used that are compatible with the outer layers of the multi-layered rope 120, which are typically a gum composition. Preferably, any alternative anti-adhesive processing aid does not inhibit the visual appeal of the layered configuration of the finished pieces.

The anti-adhesive processing aid 143 may be applied by a continuous drop system 145. This continuous drop system may make a single application of the anti-adhesive processing aid upstream of all of the rollers 135, 137, 139, 141 of the rope-sizer 134. Alternatively, the system may apply the anti-adhesive processing aid intermittently between the individual pairs of rope-sizer rollers 135, 137, 139, 141. When applying the anti-adhesive processing aid 143 between pairs of rollers, the anti-adhesive processing aid 143 may be applied before each pair of rollers 135, 137, 139, 141 or may be applied before only some of, but not all of, the pairs of rollers 135, 137, 139, 141.

Further yet, the anti-adhesive processing aid need not be directly applied to the multi-layered rope 120. Instead, the anti-adhesive processing aid may be applied directly to the individual rollers 135, 137, 139, 141 of the rope-sizer 134.

After the multi-layered rope 120 has been bulked sized 214 by passing through the rope-sizer 134, the multi-layered rope 120 is conditioned 218. The multi-layered rope 120 is thus passes through a conditioner in the form of conditioning tunnel 136 (also referred to as a cooling tunnel). The conditioning tunnel 136 is illustrated as a multi-pass conditioning tunnel having temperature and/or humidity control. In one embodiment, the conditioning tunnel 136 is a nine pass conditioning tunnel, but other number of passes can be used while remaining within the scope of the present invention. The conditioning tunnel 136 will condition the multi-layered confectionery composition such that it is ready for packaging. More particularly, it will reduce the temperature and establish or maintain a desired moisture content such that the multi-layered confectionery composition has the desired visco-elastic properties to facilitate downstream cutting. Typically, this results in increased stiffness and reduced tackiness or stickiness to prevent deformation of the product (i.e. bending or poor cutting) or adhering of the product to downstream cutting apparatus. The conditioning can be particularly beneficial to help prevent any oozing of any intermediate layers that may have lower viscosity values than outer layers.

For instance, in some implementations, the viscosity of one layer may be 80, 81, 82, 83, 84, 85, 86, 87, 88, 89, 90, 91, 92, 93, 94, and 95 percent the viscosity value of another layer and/or ranges therebetween. Preferably, the difference is less than 5%.

As the multi-layered rope 120 transfers from one conveyor to the next conveyor (i.e. vertically downward) the multi-layered rope 120 will stretch along the flow path, i.e. its length L, as well as contract along the width W and thickness T. To prevent bow-tying of the multi-layered rope 120 as it passes from one level to another of the multi-pass cooling tunnel 136, each successive conveyor within the conditioning tunnel 136 has a linear conveying speed that is slightly faster than the previous conveyor. In some embodiments, the multi-layer rope 120 may increase in linear speed between about two (2) percent and fifteen (15) percent from the time it enters the conditioning tunnel 136 to the time it exits the conditioning tunnel. More typically, the linear speed along the flow path will increase from between about four (4) percent twelve (12) percent and even more typically between about six (6) percent and about ten (10) percent.

As the multi-layered rope 120 stretches along its length L, the rope 120 will also contract along its width W and its thickness T.

Additionally, as the multi-layered rope is being reduced in temperature and/or moisture, the rope 120 will also contract due to thermal expansion/contraction principles.

After the step of conditioning 218, the multi-layered rope 120 is again further sized during a step of pre-sizing 220. Thus, downstream from the conditioning tunnel 136, a pre-sizer 140 performs finish sizing of the multi-layered rope 120 prior to being formed into individual pieces. In a preferred embodiment, the pre-sizer 140 is a rope-sizer substantially similar to the rope-sizer 134. As such, the pre-sizer generally acts based on the theory of stretching the multi-layered rope 120 so as to effectuate contraction in both the width W and thickness T directions. However, the pre-sizer, as less forming is required, has a fewer number of pairs of rollers. The pre-sizer 140 substantially finalizes both the width W and thickness T of the multi-layered rope 120. Preferably, the pre-sizer 140 reduces either the width W or thickness T by no more than one-half (0.5) mm and more preferably no more than one-fifth (0.2) mm. Due to the limited amount of sizing, compressive roller arrangements may be employed as well. Further, the reduced temperature and increased conditioning time places the multi-layered rope 120 in better condition to react to compressive forces of other types of sizing operations.

The pre-sizer 140 preferably obtains a width W that is preferably within 95, 96, 97, 98, 99, 99.5 and/or ranges therebetween of a desired final dimension value of either the desired final width FW or final length FL of the individual pieces 146.

To avoid adhering the multi-layered rope 120 to the pre-sizer 140. The system will typically include a further continuous drop system 147 for applying 222 an additional anti-adhesive processing aid 149 between the pre-sizer 140 and the multi-layered rope 120. Again, it is preferred that this anti-adhesive processing aid 149 does not inhibit the visibility of the multiple layers of the end product. Typically, this anti-adhesive processing aid 149 is similar to or the same as the anti-adhesive processing aid 143 used during rope-sizing.

Further, during this step of applying an additional anti-adhesive processing aid 222, anti-adhesive processing aids may be directly applied to the sides of the multi-layered rope 120. In the illustrated embodiment, the processing equipment includes a pair of rollers 155, also referred to as basting rollers, that apply anti-adhesive aids directly to the side of the rope 120 that visibly illustrates the multiple layers of product. No sizing or limited sizing of the rope 120 occurs by these rollers 155. This addition of the anti-adhesive aids to the sides of the rope 120, and particularly the sides that illustrate the different layers, can also assist in preventing the individual pieces, and particularly the stickier layers of individual pieces, from adhering to the wrapping paper or other pieces of product during and/or after packaging of the pieces.

After final sizing, the multi-layered rope 120 will pass into a cut-and-wrap apparatus 144 for cutting 224 the individual pieces from the continuous multi-layered rope 120 and then wrapping them in a wrapper. The cut-and-wrap apparatus 144 includes a cutting device that severs individual pieces from the continuous multi-layered rope 120. The cut-and-wrap apparatus 144 also wraps 224 the individual pieces 146. In one embodiment, the cut-and-wrap apparatus 144 includes chilled guide walls to maintain the temperature of the multi-layered rope 120 such that the multi-layered rope 120 is stiff enough to be cut as well as to prevent the multi-layered rope 120 from becoming sticky and binding on the cut-and-wrap apparatus 144.

Further yet, the cut-and-wrap apparatus 144 may include some final sizing of the pieces 146.

After the cutting and wrapping process, the individual pieces 146, in wrapped form, are then packaged which is also referred to as cartoning 226.

In the illustrated embodiment, the finished pieces 146 are packaged into rigid packages 150 using a cartoning machine 151. The rigid packages 150 are illustrated more fully in FIG. 7 in simplified schematic form. The rigid package 150 will include rows, typically two rows 148, 149, of a predefined number of pieces 146 arranged in a side-by-side arrangement. In the illustrated package 150, there are ten (10) pieces in the package 150 such that each row 148, 149 includes five (5) side-by-side pieces. To insert the five pieces 146 into the desired row 148, 149 of the package 150, the five pieces 146 are first positioned side-by-side and then simultaneously inserted into the package 150 in an end-to-end direction, i.e. parallel to the final length FL of the pieces 146.

While not shown, these individual packages are then further processed, such as by being wrapped in clear plastic and then added to larger boxes and then wrapped for shipment to retail establishments. However, these aspects and processes can be conventional and are not further discussed.

While not shown in the schematic representation of FIG. 1, methods of the present invention may utilize recycling of salvage. For instance, due to various operations, salvage may be generated that is portions of either one of the confectionery compositions 102, 104 or the multi-layered rope 120 that have been removed from the process that would otherwise be discarded. This may occur during maintenance intervals, start-up or shut-down of the system. Other times may exist when salvage may be generated.

However, as one of the benefits of the multi-layered confectionery composition 120 is the visual appearance of the layers, salvage must be dealt with in a much more exacting manner. In prior systems, the salvage could be dumped back into the system with limited or no effect on visual appeal. Further, the recycling of salvage would typically not significantly effect the physical properties of the confectionery composition. However, if salvage including part of the candy composition is added into the gum composition, the physical properties and visual appeal of the gum composition may be significantly effected.

Thus, some embodiments of the present invention may include recycling a portion of the multi-layered rope 120 such that it is passed through the step of co-extruding at least twice. This salvage may be returned back to various locations. Preferably, the salvage is returned back to the steps of forming the confectionery compositions 102, 104 such that it can be sufficiently mixed into the individual confectionery compositions 102, 104 so as to homogenously distribute the salvage throughout the confectionery composition 102, 104. Thus, the salvage may be returned to processors 108, 111 in various embodiments of the method. Salvage, as an ingredient, should typically be no more than 20% by weight of the respective confectionery composition, preferably no more than 10% by weight and even more preferably no more than 5, 4, 3, 2, or 1 percent of the confectionery compositions 102 or 104 and/or ranges therebetween. The lower the amount of salvage the better as more uniform and predictable the physical properties of the confectionery compositions 102, 104 and consequently the multilayered rope will be.

Salvage could also be routed back to the pre-extruders 112, 113 or alternatively back to the feed towers 122, 124. However, the later the salvage is added to the process, the less work that will be acted on that salvage to blend it with the rest of the ingredients of an individual confectionery composition 102, 104 resulting in reduced homogeneity of the confectionery compositions 102, 104.

Preferably, salvage will not alter the visual characteristics, such as color or texture, for example, viscosity or elasticity by more than 10% and preferably by no more than 5% as compared to if no salvage was added to the confectionery composition 102, 104. Affects on the visual appeal could be measured using a colorimeter to monitor changes in color.

Now that a general overview of the process and processing equipment used to form multi-layered confectionery compositions according to the present invention have been described, more specific features and obstacles that have been over come by the Applicants or contemplated will be discussed.

Unfortunately, by using pre-constructed rigid packages 150, the tolerancing of the individual pieces 146 must be maintained to avoid the appearance that not enough pieces have been inserted into the package or such that in fact not enough pieces can be inserted into the package. However, in view of the fact that the confectionery composition is a confectionery composition formed from a plurality of different confectionery compositions added together, typically having differing physical properties and more particularly visco-elastic properties, the confectionery composition is a more complex structure. Further, because the different confectionery compositions are in layered form, when the confectionery compositions have different physical properties, the different properties such as visco-elastic properties are distributed in layer form creating a physically discontinuous mass. Thus, different processing steps in forming the pieces by processing the entire multi-layered product after it has been co-extruded can have different affects on different ones of the confectionery compositions forming the different layers of the multi-layered confectionery composition. For example, compressive forces applied along the thickness T direction could cause lateral oozing of the center layer to a greater extent than an outer layer, when the inner layer has a lower viscosity than the outer layer. Similarly, one layer may cool at a faster rate when passing though a cooling tunnel than a different layer. These problems are typically not encountered during standard sizing and forming processes when dealing with a substantially consistent confectionery composition.

Figure 8:
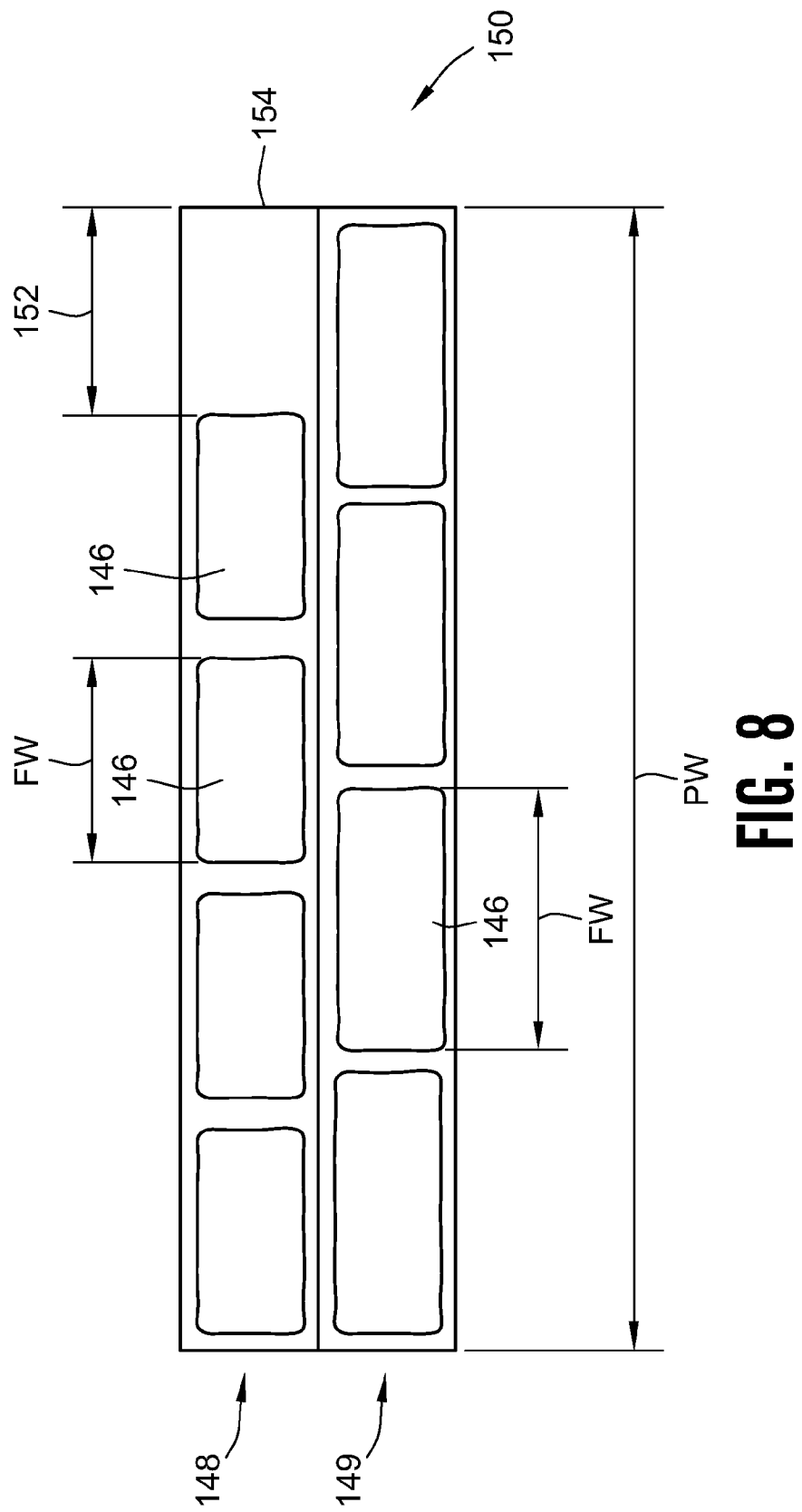
FIG. 8 is a schematic end view illustration of the rigid package of FIG. 7 illustrating potential problems in packaging resulting from loss of tolerance in the processing of a multi-layered confectionery composition.

More particularly and with reference to FIG. 8, when using pre-constructed rigid packages 150, the tolerancing of the individual pieces 146 must be maintained to avoid the appearance of not enough pieces have been inserted into the package. The sum of the final widths FW of the five pieces 146 needs to be not too small relative to the overall package width PW of each row of the package such that a gap 152 between the end piece 146 and the side 152 of the package 150 are minimized to avoid the appearance that pieces are missing. Such an appearance can give a negative impression on the consumer that they were not getting what they paid for, even if the predetermined number of pieces (ten in the instant example) were in fact in the package. This potential problem when the tolerancing of the size of the pieces 146 is not maintained is illustrated by row 148 of the package 150 of FIG. 8.

Similarly, the tolerancing of the individual pieces 146 must be maintained to avoid too few pieces 146 actually being installed into the package. In other words, the tolerancing of the individual pieces 146 must be maintained such that the sum of the final widths FW of the five pieces 146 is not sufficiently large relative to the overall package width PW of each row of the package 150 such that less than five pieces 146 can be inserted into the package 150. Again, this would provide a negative impression to the consumer that they were not getting what they paid for. This potential problem associated with poor tolerancing of the size of the pieces 146 is illustrated by row 149 of the package 150 of FIG. 8. Another issue with this particular problem is that this configuration can result in the cartoning apparatus 151 that packages the pieces into the package 150 to jam causing undesirable downtime for the line.

There are two ways that are contemplated as being the most typical ways of forming the actual pieces 146 from the continuous multi-layer rope 120 when using a cut and wrap process. These two ways are similar in operation, but have significantly different effects on potential tolerancing of the final width FW dimension on individual pieces thus effecting the final tolerance of the overall row of side-by-side pieces that are inserted into the package 150.

In a first embodiment, with reference to FIG. 9, the cutting device 168 severs individual pieces such that the cut line 170 is generally aligned with the final length FL. In this arrangement, the final width FW of each piece 146 is defined upon severing the piece 146 from the continuous multi-layer rope 120. In an alternative embodiment, with reference to FIG. 10, the cutting device 168 severs individual pieces 146 such that the cut line 170 is generally aligned with the final width FW. In this arrangement, the final length FL of each piece 146 is defined upon severing the piece 146 from the continuous multi-layer rope 120.

The first cutting arrangement, illustrated in FIG. 9, permits faster processing of pieces because less length of the multi-layered rope 120, i.e. the length equivalent to the final width FW of the piece must pass beyond the cutting device 168 in between cuts. This may also be understood as the concept that less rope must be "pulled" to form individual pieces.

Unfortunately, this arrangement allows for greater variability in the critical dimension, i.e. the final width FW, of the piece of multi-layered confectionery composition. Because each piece side of the piece 146 is defined by the cutting action, any error in the location of the cutting action gets multiplied by each piece. This can have a significant disadvantage in the instant application because tolerancing is so important and can be difficult to control or adjust based on the complex and discontinuous nature of the multi-layered confectionery composition.

The second cutting arrangement, illustrated in FIG. 10, generally provides for slower processing of pieces relative to the first arrangement because more length of the multi-layered rope 120, i.e. the length equivalent to the final length FL of the piece, must pass beyond the cutting device 168 in between cuts. In other words, more of the multi-layered rope must be pulled during the cutting process. Thus, if the linear speed of the material along the flow path is the same for both processes, less pieces are being manufactured.

However, this second arrangement provides one significant advantage. Particularly, by using this arrangement, there is less variability in the critical dimension, i.e. the final width FW, from one piece to the next because all of the final width FW dimension is determined prior to severing and is substantially defined by the upstream pre-sizer 140. Thus, when the plurality of pieces cut during the process are aligned side-by-side in preparation to being inserted into the package 150, the well maintained dimensions are positioned side-by-side, rather than having the potentially variable cut sides adjacent to one-another. More particularly, the width W of the rope corresponds to the final width FW of the individual pieces 146. This method of cutting is the preferred method due to the significantly more exacting final width FW produced.

In one embodiment, rather than five pieces 146 arranged in each row 148, 149, seven pieces are arranged in a given row 148, 149 such that the package 150 has a total of fourteen pieces 146. Further, each piece has a desired final width FW of approximately eleven (11) mm. Further, the paper wrapping of each individual piece has a thickness of approximately one-tenth (0.1) mm. Thus, the total width of the seven pieces arranged in a row in side-by-side fashion is approximately 78.4 mm. To avoid some of the significant problems discussed above with reference to having gaps formed in the row or not being able to insert the full set of pieces within the row 148, 149 of the package 150, the seven piece wrapped width has a tolerance range of plus-or-minus four and a half (4.5) mm.

As noted above, the preferred method for forming the multi-layered rope 120 is to form the multi-layered rope 120 such that the width W corresponds to the final width FW of the piece 146. When this is the case, the Applicants have determined that the overall width of the grouped pieces prior to being inserted into the rigid package 150 can be modified by various modifications or alterations in the upstream processes to maintain the width of the plurality of pieces arranged in side-by-side arrangements within a desired tolerance range.

Thus, an operator may sample the final widths FW of pieces 146 and adjust processing parameters when the average size of the final widths FW of the pieces 146 is outside a predetermined tolerance range. Other parameters and steps may be monitored and implemented to provide desired final piece 146 content and size.

A first method to modify and/or improve the final dimensions and dimensional tolerances of the multi-layered rope relates to improving consistency of the confectionery compositions as they exit the co-extruder 116. This consistency may be based on compositional consistency or physical property consistency of the individual confectionery composition 102, 104, for example, but not limiting, temperature and visco-elastic properties.

Typically, the compositional consistency will have a direct effect on the temperature and/or visco-elastic properties. For one non-comprehensive example, if insufficient mixing of a powder ingredient of the confectionery composition 102, 104 has occurred, an agglomeration of powder may get extruded into that corresponding layer of the multi-layered rope 120 which would have significantly different elasticity and viscosity properties from the desired or intended composition for that layer. For instance, if a chunk of powdered filler, such as calcium carbonate, is extruded into the gum layer 121 (see FIG. 5), this portion of calcium carbonate will have significantly different elastic properties and viscosity properties relative to a desired gum composition. Thus, when that portion of the multi-layered rope 120 passes through the rope sizer 134, an inconsistent amount of elongation in the length L direction will occur, but more importantly, a similar inconsistent amount of contraction in the width W direction will also occur, creating significant issues for the downstream packaging. The amount of contraction within the width direction W during any of the cooling or forming processes (e.g. at rope-sizer 134, cooling tunnel 136, pre-sizer 140) will also be effected.

Therefore, the Applicants have determined that increasing the amount of work that is added to the confectionery composition, particularly when the confectionery composition is a gum composition can increase consistency in both the compositional consistency as well as the physical properties relating to visco-elasticity as well as temperature.

Thus, the system 100 in some implementations can include a recycle arrangement, such as recycle arrangement 114 in the pre-extruder 112. This can be particularly useful when the upstream gum processing equipment 108 is in the form of a batch mixer. However, recycle could occur in other positions other than strictly at the pre-extruder. Instead, recycle could occur by returning portions of the gum composition 102 back to the gum processing equipment 108.

The use of the recycle arrangement allows for further mixing to increase compositional consistency that can occur when mixing a large quantity of individual components. Further, the use of the recycle arrangement can act to provide improved thermal mixing of the confectionery composition 102 prior to moving downstream toward the co-extruder 116. Thus, by providing improved thermal consistency through out different portions of the length of the rope of the first confectionery composition 102, the visco-elastic properties for any given portion of the first confectionery composition 102 will be more consistent resulting in more consistent and repeatable sizing of the multi-layered rope 120. Further, any relaxation present after any of the sizing steps will be more uniform as well. By providing for more consistent sizing of the multi-layered rope 120, the consistency of each piece 146 is similarly increased improving the ability to package the individual pieces 146 into a rigid package.

Preferred amounts of recycle range from between about 25% to about 75%, but more preferably between about 25% and 50%. For a 25% recycle, there would be four (4) ropes extruded from the pre-extruder 112 all having the same die surface area and the same extrusion rate with a single one of the ropes (see rope 102' in FIG. 4 as an example of a return or recycle rope) being returned back for further processing through pre-extruder 112. FIG. 4 actually represents a 50% recycle arrangement. In that illustration, one rope, rope 102, is allowed to pass to downstream processing equipment while the other rope, rope 102', is returned back for increased processing in the pre-extruder 112. It should be noted that not all ropes exiting the pre-extruder 116 need to have the same cross-sectional area. Typically, however, all ropes that are permitted to pass downstream for further processing are maintained at a constant surface area, while a recycle rope 102' may have a different surface area so as to effectuate the desired amount of recycle. Thus, three ropes could be used for a 50% recycle where the combined area of two of the ropes proceeding downstream is equal to the area of the rope being recycled.

In FIG. 4, the return rope 102' is illustrated as being fed back into the side of the pre-extruder 112. However, the return rope 102' (also referred to as "the recycled rope 102'") could be fed via a properly configured conveyor system back into the feed/storage tower 172 of the pre-extruder 112 so as to provide a simpler extruder design.

The Applicants have also determined that sampling the amperage of the pre-extruder 112 can also provide feedback as to whether there will be width variation. More particularly, if the extruder screw elements are maintained at a constant RPM (rotation per minute), if the amperage used to drive the screw elements varies, this provides an indicator that the visco-elastic properties of the material exiting the pre-extruder are not being maintained at a constant or consistent value. For instance, if it takes more energy to extrude the same amount of product through the co-extruder 112, the product is more viscous than other product that takes less energy, i.e. amperage. Thus, when variations in energy used to pre-extrude the various confectionery compositions 102, 104 prior to adding the confectionery compositions 102, 104 to the co-extruder 116, width W variation would be expected due to variations in visco-elastic properties of the confectionery compositions 102, 104 as they are co-extruded. Most typically, when amperage decreases the corresponding width W increases suggesting that the gum is less viscous and that more gum is able to be extruded through the die of the pre-extruder 112 as well as co-extruder 116. Presumably, the reduction in viscosity is most likely due to higher material temperature. However, it is possible that the variation in the visco-elastic property could be due to variation in the composition or completeness of mixing of the confectionery composition 102, 104.

Work can also be performed on the confectionery compositions 102, 104 in the co-extruder itself. However, this is less desirable.

Thus, embodiments of the invention relate to increasing final piece size consistency by increasing physical and compositional consistency of the confectionery compositions as they are fed into the co-extruder 116.

Another way to maintain final piece size within desired tolerances is to maintain a more consistent throughput of material through the co-extruder 116. The Applicants have determined that one factor effecting throughput of the confectionery compositions 102, 104 through the co-extruder are affected by feed conditions of the confectionery compositions 102, 104 into the various feed towers 122, 124 of the co-extruder 116.

If the co-extruder is "starved" of one of the confectionery compositions 102, 104 of the multi-layered rope 120, width W variations are expected because less than the desired amount of material is extruded. For example, if the co-extruder is fed the first confectionery composition 102 at too slow of a rate, not enough material will be present in layers 121, 125 of the rope example of FIG. 5. Thus, when the multi-layered rope is exposed to subsequent downstream processing variations in the width W dimension will be experienced. When the co-extruder is starved of feed from one or more of the confectionery compositions 102, 104, the width W will decrease such that the lower end of the tolerance range will be approached or potentially passed.

Further, if too much material is extruded by the co-extruder 116, the width W as well as but less critical, the thickness T of the rope and thus the corresponding final dimensions will typically be too high.

This may occur due to the viscosity of the confectionery composition 102, 104 being too low as it is fed into the co-extruder 116. Presumably, when the viscosity is too low, increased flow (i.e. mushrooming) of the material beyond the fixed dimensions of extruder die will occur causing the width W and thickness T dimensions of the multi-layered co-extruded rope 120 to be larger than expected such that the downstream sizing and processing does not reduce those dimensions to the desired dimensions. Thus, this results in the final piece dimensions to be too large because the rest of the forming equipment downstream of the co-extruder is not calibrated to handle the amount of material that must now be sized to the desired final dimensions.

Alternatively, the co-extruder 116 may extrude too much material if too much material is fed into the co-extruder 116 and particularly into the barrels of the co-extruder 116 causing too much. If too much material is internal to the co-extruder, pressure within the co-extruder 116 will typically increase causing more than the desired amount of material to be driven through the die of the co-extruder 116, again, resulting in dimensions of the multi-layered rope 120 for which the downstream forming equipment is not calibrated to process to the desired final width W and length L dimensions.

Thus, embodiments of the invention relate to methods and apparatus for maintaining uniform and consistent feeding of material into the co-extruder 116. In one embodiment, the feed towers 122, 124 of the co-extruder are support on load cells or other weight measuring devices to continuously analyze the amount of product that is being fed into the co-extruder 116. In such an instance where information regarding the feed rate of material into the co-extruder 116 is available, utilizing a loafing machine either after the pre-extruder 112 and/or in substitute thereof is contemplated to provide improved control of the feed rate into the co-extruder 116. Further, when using a loafing machine, the rate at which the material is fed into the co-extruder 116 be modified without directly affecting upstream processes, such as the rate at which product is being expelled from the pre-extruder 112.

For example, if it is deteiinined that too much material is being fed to the co-extruder 116 (e.g. the rate at which loaves are fed to the co-extruder 116 is too great), the user has the opportunity to slow down the rate at which the loaves of product are fed into the co-extruder 116 without affecting the upstream production of the loaves. This can be effectuated, such as by merely speeding or slowing a conveyor.

While the ability to speed or slow a continuous rope may be available to some extent without effecting downstream processing, this is only to a more limited degree due to the continuous nature of the rope without affecting upstream processes. For instance, if the user needs to reduce the rate at which the rope is being fed into the co-extruder 116, this could cause a back-up of the rope if the pre-extruder 112 is maintained at a constant output rate. Unfortunately, as the rope is continuous, it may back-up on itself resulting in bow-tying or overlapping of the rope if the pre-extruder 112 is not also slowed. However, slowing the pre-extruder can detrimentally effect the consistency of the physical properties of the rope as described more fully above. Further yet, with a continuous rope, it is much more difficult to altogether stop feeding material into the co-extruder 116 because the rope must be cut.

Thus, in some embodiments, it is desired to maintain the feed rate of one or more of the confectionery compositions into the co-extruder within 10% of a desired rate and more preferably within 5% of a desired rate. The rate of feeding can be adjusted by shortening or lengthening a feed path between the pre-extruders or similar devices and the co-extruder. For instance, when using a continuous rope of a confectionery composition 102, 104 upstream of the co-extruder 116, the rope could be passed through a serpentine pathway to lengthen its travel distance and thereby reduce its feed rate. Further, the feed rate could be increased by manually adding portions of the needed confectionery composition 102, 104. This could be the addition of individual chunks or loaves of the needed confectionery composition 102, 104.

The Applicants have further determined that an additional way to maintain consistent tolerances, when forming multi-layered confectionery compositions, includes maintaining similar visco-elastic properties between the plurality of different confectionery compositions, at least during the bulk sizing operations. More particularly, it is desired to have a elasticity ratio of no more than 3:1 between any given pair of confectionery compositions within the multi-layered confectionery composition. However, it is more preferred to have the ratios be no more than 2.5:1 and even more preferably no more than 2:1. By pairing the elasticity of the different confectionery compositions, the various sizing processes, such as bulk sizing or pre-sizing can be more accurately controlled as the multi-layered rope 120 will more closely approximate a rope formed from a continuous material. In other words, matching of the visco-elastic properties facilitates the different confectionery compositions to flow together during the various processes that result in dimensional deformation of the multi-layered rope 120.

Preferably, the viscosity of a given layer is no less than 90 percent of the viscosity of the other layers and particularly an adjacent layer and preferably no less than 95 percent. However, at a minimum the viscosity of one layer relative to another may be 80, 81, 82, 83, 84, 85, 86, 87, 89, 90, 91, 92, 93, 94 or 95 percent and/or ranges therebetween. These values may be immediately prior to the steps of co-extrusion or bulk-sizing or both. Again, recycling of portions of a confectionery composition 102, 104 can be used to maintain the desired viscosity matching between the different confectionery compositions.

When the visco-elastic properties do not match perfectly between different layers of a multi-layered confectionery composition, compensation may be included to rectify the deficiency. For instance, and with reference to FIG. 5, if layers 121 and 125 have a higher viscosity value than middle layer 123, the middle layer may have a slightly different dimension than the other two layers 121, 125, as extruded such that the final dimensions are the same. For example, if the top and bottom layers 121 and 125 are extruded at approximately thirty (30) mm in width W, the middle layer, having a lower viscosity being more susceptible to oozing, may be extruded at width less than thirty (30) mm. Then, during downstream sizing of the multi-layered rope, any compression that gets transferred to the middle layer 123 that results in any lateral oozing would not cause the middle layer to extend laterally outward from the edges 174, 176 of the multi-layered rope 120. The lateral oozing beyond edges 174, 176 would again affect the desired final width FW of a given piece 146.

Preferably, when this compensation is used, the widths W of adjacent ones of the layers 121, 123, 125 has a first percentage difference after bulk sizing 214 that is less than before the step of bulk sizing and even less after the step of pre-sizing 220. Preferably, after bulk sizing the percentage difference between adjacent layers is no greater than 5% and even more preferably, the percentage difference after bulk sizing is no greater than 0.5%.

Additional benefits of co-extruding a plurality of confectionery compositions into a single multi-layered confection will now be discussed. If one of the confectionery compositions typically caries ingredients that can be degraded or lost due to normal processing steps for forming that type of confectionery composition, then those ingredients may be able to be added to the other confectionery composition such that they form part of the overall multi-layered confectionery composition but are not required to be exposed to the more detrimental processes.

For example, the formation of gum compositions typically includes at least some level of high-shear and/or high temperature mixing. However, several ingredients such as flavors, sensates, and sweeteners (particularly encapsulated sweeteners), can be very sensitive to high-shear and/or high temperatures. By using a second confectionery composition, these highly sensitive ingredients may be added to the second confectionery composition such that they are still available to the consumer but not exposed to the high shear and/or high temperature processing steps. Thus, the second confectionery composition acts as a carrier for these highly sensitive ingredients.

Additionally, some of these ingredients, for example encapsulated sweeteners, are intended to delay release of the effect of the ingredient, such as when used in gum, as the user continues to chew the product. In some instances, these ingredients, if added to a confection formed solely of the second confectionery composition, would be ingested too quickly to realize the desired effect they are intended to provide. However, by pairing the second confectionery composition with the first confectionery composition, such as for example a gum composition, as the user chews the multi-layered confectionery composition some of these longer lasting ingredients will be absorbed with and combined with the long lasting gum composition, thus preventing the ingredients from being ingested by the user. Now, the first confectionery composition may become the carrier of these ingredients as they are present in the consumers mouth during the prolonged chewing experience provided by the inclusion of the first confectionery composition as a gum composition.

Rather than being concerned about the processing sensitivity of a various ingredient, producing a multi-layered confectionery composition can provide additional flavor or sensorial profiles that could not be produced by providing a single type of confectionery composition. For example, it is often desired for a gum composition to have a very strong initial sensorial and flavor hit to the consumer such that they consumer has almost instantaneous gratification. However, the inclusion of the gum base components and particularly the water insoluble elastomeric components in gum can encase these ingredients inhibiting or delaying the release of these ingredients from the composition such that either the sensation is delayed or alternatively more of these ingredient must be included in the formula for the gum composition. However, if these ingredients are carried in the water soluble second confectionery composition such as a chewy candy, it is contemplated that the users experience can be improved by using the same amount of that ingredient. Alternatively, a similar level of that initial sensation can be provided to the consumer by providing less of that ingredient.

Another feature that can promote improved tolerances is the adhesion between the adjacent layers of the multi-layered confectionery composition. By having a strong bond between the adjacent layers, the transverse strain in the multi-layered rope due to the linear stretching during the forming processes are more consistently transferred from layer to layer.

This is particularly beneficial when using rope-sizers to perform the bulk and pre-sizing of the multi-layered rope 120. As the rope-sizers tend to operate based on stretching the multi-layered rope 120, if there is not adequate adhesion between the adjacent layers, the outer layers, such as layers 121 and 125 will slip in the relative to the middle layer 123. If the outer layers 121, 125 slip relative to the middle layer 123, reduce forces will act on the middle layer 123 reducing the effectiveness of the sizing action on the middle layer 123. Thus, there will be significantly less uniform sizing of the middle layer 123 resulting in a mis-shaped rope.

Therefore, in some embodiments of the invention, the resulting multi-layered confectionery composition has sufficient adhesion such that the individual layers 121, 123, 125 cannot be separated from one another without destroying the individual layers. In other words, when attempted to pull the layers apart, pieces of the individual layers will break and remain adhered to the other layers rather than separating therefrom.

However, such the level adhesion is not necessary. There only needs to be sufficient adhesion between adjacent layers such that the adjacent layers will not slip relative to one another when subject to the various sizing operations required to reduce the size of the multi-layered rope 120 from its extruded size to its final size prior to the cutting process.

When one of the confectionery compositions is a candy composition, it is desired that the candy composition is substantially or fully grained (i.e. crystallized) prior to packaging. The high level of graining reduces cold-flow of the candy composition subsequent to packaging. Cold flow subsequent to packaging, particularly in packages 150 as illustrated in FIG. 7, can cause adjacent pieces to mold together causing the pieces to be difficult to remove from the package and also providing a negative impression on a consumer.

In some embodiments, it is desired that the candy composition is substantially crystallized prior to co-extruding, after conditioning, or at least prior to bulk sizing. In these situations, it is preferred that the candy composition is at least 85% crystallized, more preferably at least 90% crystallized, more preferably at least 95% crystallized, and even more preferably at least 97.5% crystallized prior to co-extruding, conditioning or bulk-sizing.

Further, avoiding cold flow will also prevent individual layers from causing the dimensions of the multi-layered rope 120 from altering other than during the desired bulk sizing and pre-sizing steps.

It should be noted that individual pieces of processing equipment, such as the pre-extruder 112 can be used to feed parallel equipment downstream. For instance, two pre-extruded ropes can be generated by the pre-extruder 112 to feed two separate but parallel co-extruders. Similarly, when two ropes are produced by a single pre-extruder, the two ropes could be pre-conditioned by passing them through the same pre-conditioner 118.

Figure 11:
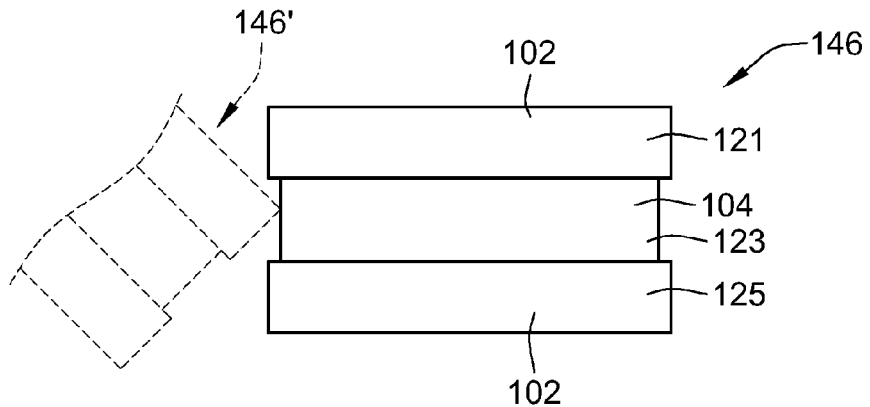
FIGS. 11-13 are simplified cross-sectional illustrations of alternative piece shapes to promote reduced sticking between pieces that contact one another absent a wrapping paper.
Figure 12:
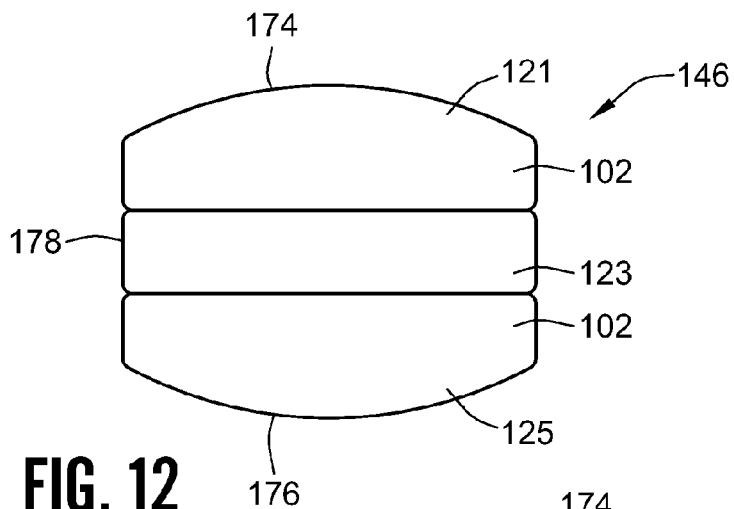

In some implementations, a plurality of pieces 146 may be housed in a single bag or container in an unwrapped state. Thus, each individual piece will come into surface-to-surface contact with other pieces. However, as the gum compositions 102 and candy compositions 104 (when used) can be very sticky such that the contact therebetween can cause the pieces 146 to stick together. This is particularly true when a candy composition is used as one of the layers. Thus, the present invention relates to methods of counteracting the tendency of contacting pieces to stick together. With reference to FIGS. 11 and 12 additional piece shapes are illustrated to attempt to prevent this sticking together.

In FIG. 11, each individual piece has substantially rectangular layers 121, 123, 125. However, the middle layer, 123 has a length and/or a width that are reduced relative to the length and/or width of the outer layers 121, 125 such that it is more difficult for the middle layer 123 (also referred to as inner layer 121) from contacting the surface of other pieces. For the outer surface of layer 123 to come into contact with another piece 146, a corner of that other piece must pass into the recess formed between outer layers 121, 125. Thus, if the corner contacts inner layer 123, only a line or possibly point contact is formed therebetween, reducing the adhesion between the two pieces.

FIG. 12 illustrates a further piece shape. In FIG. 12, piece 146 has top and bottom layers 121, 125 that have curved top and bottom faces. 174, 176, respectively. Further, layer 123 may or may not have recessed sides 178. However, even with flat side 178, if that flat side 178 were to contact top or bottom side 174, 176, only a line contact, rather than a surface-to-surface contact would be formed further reducing adhesion therebetween.

Figure 13:
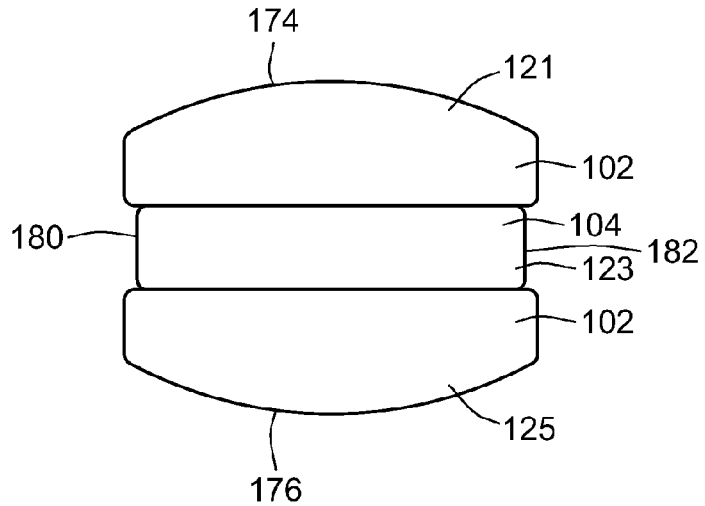

FIG. 13 illustrates a further piece shape. In FIG. 13, piece 146 has top and bottom layers 121, 125 that have top and bottom curved surfaces 174, 176, facing away from one another. This arrangement incorporates the advantage of the piece illustrated in FIG. 12. Further, middle layer 123 has a width and/or length that is less than the width and/or length of the outer layers 121, 125 such that the middle layer 123 is recessed laterally inward to provide the benefits discussed with regard to the piece 146 of FIG. 11. However, in this embodiment, layer 123 has curved sides 180, 182 as well. These curved sides 180, 182 further promote the contact between adjacent pieces, as being line contacts rather than surface-to-surface contacts.

Typically only the length or the width of a middle layer will be less than the length or width of the outer layers as one dimension is typically defined by the cutting process. However, it is contemplated to have both the length and width recessed in an optimal arrangement.

SPECIFIC PROCESS EXAMPLE

Now that a general overview of the processing methods and corresponding equipment as well as the difficulties and features associated therewith when processing multi-layered confectionery compositions have been discussed, more particular examples of processes and processing parameters will be discussed.

The example will be described with reference to FIGS. 1A, 1B, 3, 5 and 6. The resulting multi-layered confectionery composition will have three layers 121, 123, 125 having top and bottom layers 121, 125 formed from a single gum composition 102 and a middle layer 123 formed from a chewy candy composition 104. Further, all three layers 121, 123, 125 define a portion of the outer-periphery of the cross-section of the multi-layered confectionery composition, particularly at least two sides.

Gum Processing

The processing of the gum composition will begin by melting the gum base to a temperature of between about seventy-five (75) ° C. and about ninety-five (95) ° C. in the batch mixer 108', but most typically, in a separate mixer. The batch mixer 108' will be preheated to a temperature of between about forty (40) ° C. and fifty-five (55) ° C. The powder ingredients including sweeteners or powdered colors will then be added to the batch mixer 108' and mixed. After the powders have been mixed, the molten gm base will be added in combination with molten fats and liquid sweeteners. After mixing for a period of time, flavors are added. While mixing, the temperature of the mix should remain between the forty (40) ° C. and fifty-five (55) ° C. range indicated above. After mixing the powdered sweeteners, colors, gum base, fats, liquid sweeteners and flavors for a predetermined period of time base on desired consistency and texture, additional long lasting flavors and sweeteners in addition to acids are added to the batch mixer 108'. After further mixing, the gum composition 102 is finished and ready to be pre-extruded.

Typically, the gum composition 102 will sit for approximately 5-20 minutes prior to being added to pre-extruder 112 but is not permitted to sit for more than one and a half hours before being added to the pre-extruder 112.

Candy Processing

Simultaneously while the gum composition is being processed, the candy composition (also referred to as a "chewy candy composition") is being processed.

The processing of the candy composition will begin by forming a batch of fondant. The fondant is preferably formed using the processing steps identified in Unexamined Japanese Patent Application Bulletin No. 2007-215450, Patent Application No. 2006-37910 to Michihide Obara, filing date Feb. 15, 2006, published Aug. 30, 2007, which is incorporated herein by reference in its entirety. The processing will include using a fondant maker that can steam jacketed at between about 0.5-2.5 bar pressure and as well as cooled with water between about 30° C. and 60° C.

A mixture of powder and syrup based sweeteners as well as wader is mixed in this processor. The syrup formed from the various sweeteners and water is agitated at speeds of between about 10 RPM and 20 RPM and then cooked with low pressure steam. The syrup is cooked until a temperature of between about 110° C. and 150° C. is reached. The steam is then turned off and the cool water is turned on in the jacket of the processor. The agitator speed is increased to between about 25 RPM and 75 RPM. The syrup is then cooled to approximately between about 45° C. and 65° C. to obtain the finely crystallized fondant with an average particle size of between about 25 microns and 40 microns. The fondant is then discharged into a plastic holding container.

The candy composition, using the fondant as an ingredient, is then formed. The candy cooking apparatus is preferably a semi-continuous candy cooker. First, a master batch of syrup including liquid and powder sweeteners and water are mixed. The master batch is heated to and maintained at a temperature of between about 40° C. and 70° C. in a holding tank heated with low pressure steam. Oils, emulsifiers, and liquid fats are added to the holding tank.

The master batch including the oils, emulsifiers, and liquid fats are then pre-cooked to a temperature of between about 85° C. and 115° C. Color is then added.

The master batch is then added to a final cooker heated with medium pressure steam of between about 1.5 bar and 3.5 bar pressure until a final cook temperature of between about 120° C. and 145° C. is obtained to form a cooked candy mass.

The cooked candy mass is then added to a candy bowl and then a vacuum of between about 2.5 and 6.5 inches of Hg is applied. Gelatin is then added to the cooked candy mass in the candy bowl and thoroughly mixed to form a gelatinized cooked candy mass (as used herein "gelatinized" will simply mean that gelatin has been added to the mass).

The gelatinized cooked candy mass is then dropped on a cooling table that is chilled by circulating water at between about 5° C. and 25° C. Acids and flavors are then added to the gelatinized cooked candy mass by folding until the temperature of the mixture drops to between about 45° C. and 80° C. to form a folded gelatinized candy mass.

The folded gelatinized candy mass is then transferred to a kneading machine. The table of the kneading machine is also chilled by circulating water at between about 5° C. and 25° C. The candy is kneaded for several cycles until the temperature drops to between about 35° C. and 65° C.

The previously prepared fondant is then added to the folded gelatinized candy mass to form the chewy candy composition. Typically the fondant will be approximately between about 5% and 20% by weight of the overall mass of the chewy candy composition. Once mixed with the folded gelatinized candy mass, the fondant itself is no-longer discernable within the chewy candy composition. Thus, after the addition of the fondant and it being homogenously mixed with the folded gelatinized candy mass, the combined mass is considered a candy and not fondant. The chewy candy composition is then transferred to a double arm pulling machine and processed first during a slow cycle and then during a fast cycle to form the chewy candy composition 104. The candy composition, when finished being pulled, will have a temperature of between about 30° C. and 50° C.

Forming/Packaging

After the two confectionery compositions 102, 104 (the gum composition and chewy candy composition) are produced, the confectionery compositions 102, 104 are formed into the multi-layered confectionery composition.

The gum composition 102 is first pre-extruded 206 using pre-extruder 112. The pre-extruder 112 produce at least one rope that i permitted to pass onto downstream processes with at least one rope being returned for a recycle rate of between about 25% and 50% so as to maintain gum temperature, composition and visco-elastic uniformity. The barrel of the pre-extruder is maintained at a temperature of between about 35° C. and 50° C. while the nozzle or die of the extruder is maintained at a temperature of between about 45° C. and 60° C., such that the temperature of the gum composition 102 exiting the pre-extruder 112 is between about 45° C. and 65° C.

The gum composition 102 is then pre-conditioned 212 in pre-conditioning tower 118 at between about 15° C. and 35° C. and has relative humidity of between about 20% and 45% by making sufficient number of passes to exit at a temperature of between about 35° C. to 50° C.

The candy composition 104 is passed through pre-extruder 113.

The rope of the gum composition 102 and candy composition 104 are then fed co-extruder 116 and co-extruded 208. The gum extruder of the co-extruder is maintained at between about 45° C. and 60° C. while the candy extruder of the co-extruder is maintained at between about 30° C. and 45° C. The gum composition 102 and candy composition 104 are extruded through the extruder die to form three ropes having a width W dimension of between about 24 mm and 35 mm and a thickness T of between about 18 mm and 27 mm such that each layer 121, 123, 125 has a thickness T of between about 6 mm and 9 mm.

Preferably, the gum-to-candy weight ratio is maintained at between about 2.5:1 and 3.5:1. This ratio is maintained based as a function of extruder speed. Thus, the individual extruder portions of the co-extruder are independently driven such that the candy and gum composition rates can be adjusted independently.

After co-extrusion, the multi-layered rope 120 formed thereby is bulk sized 214 using rope-sizer 134 in the presence of anti-adhesive processing aid 143 in the form of mineral oil. The multi-layered rope 120 is reduced down from a width W of about 30 mm and a thickness T of about 24 mm to a size of between about 10-15 mm in width W and about 5-8 mm in thickness T.

The multi-layered rope 120 is then conditioned 218 in conditioner 136, which is maintained at between about 2° C. and 15° C. and relative humidity of between about 25% and 50%, such that the multi-layered rope 120 exits the conditioner 136 at a temperature of between about 20° C. and 40° C.

The conditioned multi-layered rope 120 is then pre-sized 220 to almost its final dimensions at pre-sizer 140 in the presence of anti-adhesive processing aid 149. The multi-layered rope is preferably sized to a thickness T of between about 5 and 6 mm and a width W of between about 10.5 and 11.5 mm.

The multi-layered rope 120 is then cut and wrapped 224 by the cut-and-wrap apparatus 144 into individual pieces 146 having final average dimensions of final length FL of about 35 mm, final width FW of about 11 mm and final thickness FT of about 5.5 mm in a wrapped state. In some embodiments, samples of individual pieces 146 are inspected. During the sampling, dimensions of the samples are measured to determine an average size of the individual pieces. When the average size is outside of a predetermined tolerance range, various processing parameters are adjusted to bring the individual pieces within the size tolerance range. For example, a duration of mixing in the pre-extruder and/or co-extruder may be increased or decreased. Further, an amount of one or more confectionery compositions fed into the co-extruder can be adjusted, or viscosity of one or more confectionery composition may be adjusted.

Finally, the individually wrapped pieces 146 are grouped into size-by-side arrangements of seven pieces and then packaged 226 into packages 150 with packaging apparatus 151.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a multi-layer confectionery composition comprising:
    co-extruding a first confectionery composition with a second confectionery composition that is different in at least one characteristic from said first confectionery composition to form a continuous multi-layered rope comprised of at least one layer of the first confectionery composition and at least one layer of the second confectionery composition,
    wherein said second confectionery composition is extruded at 30-45 degrees Celsius and said first confectionery composition is extruded at least 45-60 degrees Celsius,
    wherein said co-extruding includes extruding a multi-layered rope having three consecutive layers, the first confectionery composition being extruded as a first layer and a third layer, and the second confectionery composition being extruded as a second layer, and
    wherein the second layer is sandwiched between the first and third layers to make said multi-layered rope;
    passing said multilayer rope through a conditioner and cooling said multilayer rope to a lower temperature of 20-40 degrees Celsius upon exiting said conditioner;
    sizing the multi-layered rope; and
    separating the multi-layered rope into pieces.

2. The method of claim 1, further including:
    wrapping the pieces;
    grouping the pieces into packaging groups;
    inserting the packaging groups into a rigid package; and
    wherein the step of sizing includes sizing the multi-layered rope to a final width and final thickness; and
    wherein the step of separating includes cutting the multi-layered rope into pieces having dimensions of the final width, the final thickness and a final length.

3. The method of claim 1, further comprising a step of pre-extruding the first confectionery composition prior to the step of co-extruding the first confectionery composition with the second confectionery composition.

4. The method of claim 1, further comprising a step of post-conditioning the multi-layered rope subsequent to the step of co-extruding the first confectionery composition with the second confectionery composition.

5. The method of claim 1, wherein the step of sizing the multi-layered rope includes stretching the rope by rope-sizing, wherein the rope-sizing includes passing the multi-layered rope through a plurality of consecutive pairs of counter rotating rollers acting on opposed top and bottom surfaces of the multi-layered rope, and wherein the stretching of the multi-layered rope elongates the rope linearly along a length dimension and reduces the thickness and width of the rope, the thickness and width being perpendicular to the length and the direction along which the rope travels during the rope-sizing step; and wherein the rope-sizing is performed by a plurality of consecutive pairs of counter rotating rollers wherein successive pairs of rollers decrease in size when traveling along a travel path defined by the rope.

6. The method of claim 1 further comprising the step of homogenizing the first confectionery composition including pre-extruding the first confectionery composition prior to the step of co-extruding, the step of pre-extruding including recycling a portion of the pre-extruded confectionery composition such that the recycled portion is pre-extruded at least more than once.

7. The method of claim 1, wherein after the step of co-extruding the multilayered rope has a width and thickness, both being perpendicular to one another and the length of the rope, the width and the thickness both being greater than a width and a thickness following said sizing.

8. The method of claim 1, wherein the step of co-extruding includes co-extruding a multi-layered confectionery composition such that the viscosity of the second confectionery composition is lower than the viscosity of the first confectionery composition.

9. The method of claim 1;
    wherein the first, second, and third layers each define a portion of the outer-periphery of the cross-section of the multi-layered rope.

10. The method of claim 1, wherein
    the step of sizing includes bulk-sizing the multi-layered rope; and
    wherein a temperature of the first confectionery composition immediately prior to the step of bulk-sizing the multi-layered rope is a homogenous temperature.

11. The method of claim 1,
    wherein a viscosity before co-extrusion of the first confectionery composition is matched to a viscosity before co-extrusion of the second confectionery composition prior to the step of co-extruding the multi-layered rope.

12. The method of claim 11, further comprising a step of pre-extruding the first confectionery composition prior to the step of co-extruding the first confectionery composition with the second confectionery composition to provide the first confectionery composition with the viscosity before co-extrusion within a desired viscosity range.

13. The method of claim 1 further comprising the steps of:
producing the first confectionery composition including mixing a plurality of ingredients in at least one first mixer to produce the first confectionery composition, and
producing the second confectionery composition including mixing a plurality of ingredients in at least one second mixer to produce the second confectionery composition.

14. The method of claim 1, wherein the first confectionery composition is a gum composition and the second confectionery composition is a non-gum candy composition.

15. The method of claim 1, further including applying an anti-adhesive processing aid to the multi-layered rope; wherein the step of sizing occurs after applying the anti-adhesive processing aid; and
wherein the step of applying the anti-adhesive processing aid mutes a visual distinction between the first, second, and third layers by no more than 10%.

16. The method of claim 1 further including the step of forming the multi-layered rope to have at least one curved surface such that the individual pieces have at least one surface that is curved.

* * * * *